(12) United States Patent
Ota

(10) Patent No.: US 9,112,917 B2
(45) Date of Patent: Aug. 18, 2015

(54) CONTROLLER SYSTEM AND METHOD THEREFOR

(75) Inventor: Takeaki Ota, Tokyo (JP)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 2334 days.

(21) Appl. No.: 12/020,754

(22) Filed: Jan. 28, 2008

(65) Prior Publication Data

US 2008/0184226 A1    Jul. 31, 2008

(30) Foreign Application Priority Data

Jan. 29, 2007   (JP) ................. 2007-017685

(51) Int. Cl.
*H04L 29/08* (2006.01)
*G06F 9/455* (2006.01)

(52) U.S. Cl.
CPC ............... *H04L 67/24* (2013.01); *H04L 67/22* (2013.01); *G06F 9/45533* (2013.01)

(58) Field of Classification Search
None
See application file for complete search history.

(56) References Cited

U.S. PATENT DOCUMENTS

| 2002/0012329 A1* | 1/2002 | Atkinson et al. | 370/330 |
| 2002/0032751 A1* | 3/2002 | Bharadwaj | 709/218 |
| 2005/0027867 A1* | 2/2005 | Mueller et al. | 709/227 |
| 2006/0264208 A1* | 11/2006 | Moon et al. | 455/417 |

FOREIGN PATENT DOCUMENTS

| JP | 2001-231083 | 8/2001 |
| JP | 2001-242967 | 9/2001 |
| JP | 2004-064647 | 2/2004 |

OTHER PUBLICATIONS http://premium.nkkeibp.co.jp/presence/index.shtml.
3GPP TS 23.141 "Presence Service; Architecture and functional description" http://www.3gpp.org/ftp/Specs/html-info/23141.htm.

* cited by examiner

*Primary Examiner* — Corey S Faherty
(74) *Attorney, Agent, or Firm* — Hewlett-Packard Patent Department

(57) ABSTRACT

A controller system controlling a controlled target includes a user status detection mechanism which detects status of a user of the controlled target. The system also includes a controlled target status detection mechanism which detects status of the controlled target, and a control mechanism. The control mechanism controls the controlled target by mapping the detected status of the user and the detected status of the controlled target.

20 Claims, 23 Drawing Sheets

6

USER TERMINAL PROGRAM 20

USER PRESENCE STATUS

VIRTUAL MACHINE PRESENCE STATUS

USER TERMINAL SCREEN

| GROUP #1 IDENTIFIER | USER #1 IDENTIFIER | VIRTUAL MACHINE #1 IDENTIFIER |
|---|---|---|
| GROUP #2 IDENTIFIER | USER #2 IDENTIFIER | VIRTUAL MACHINE #2 IDENTIFIER |
| ... | ... | ... |
| GROUP #N IDENTIFIER | USER #N IDENTIFIER | VIRTUAL MACHINE #N IDENTIFIER |

GROUP PRESENCE STATUS

IDENTIFIER LIST OF USERS TO WHICH PRESENCE STATUS SHOULD BE SENT

FIG. 15

VIRTUAL MACHINE #1 CONTROLLING LOGIC

| STATE | STATUS OF USER #1 | CONTROL OF VIRTUAL MACHINE #1 | CONDITION |
|---|---|---|---|
| 1 | "NOT AT HOME" | CONTROLLED TO REACH "GETTING READY" STATUS | WHEN IT IS JUDGED THAT USER IS ON HIS/HER WAY TO WORK |
| 2 | "ARRIVED AT WORK" | POWER ON | – |
| 3 | "AT HIS/HER DESK" | CONTROLLED TO REACH "READY" STATUS | – |
| – | ("AT HIS/HER DESK") | ("IN USE" STATUS) | – |
| 4 | "NOT AT HIS/HER DESK" | CONTROLLED TO REACH "ON STANDBY" STATUS | AFTER GIVEN TIME ELAPSES SINCE USER LEAVES HIS/HER DESK |
| 5 | "LEFT WORK" | CONTROLLED TO REACH "SHUT DOWN" STATUS | AFTER GIVEN TIME ELAPSES SINCE USER LEAVES WORK |
| – | ("LEFT WORK") | ("OFF") | – |

VIRTUAL MACHINE #2 CONTROLLING LOGIC

| STATE | STATUS OF USER #2 | CONTROL OF VIRTUAL MACHINE #2 | NOTE |
|---|---|---|---|
| ⋮ | ⋮ | ⋮ | ⋮ |

⋮

VIRTUAL MACHINE #N CONTROLLING LOGIC

| STATE | STATUS OF USER #N | CONTROL OF VIRTUAL MACHINE #N | NOTE |
|---|---|---|---|
| ⋮ | ⋮ | ⋮ | ⋮ |

VIRTUAL MACHINE CONTROLLING LOGICS DATA

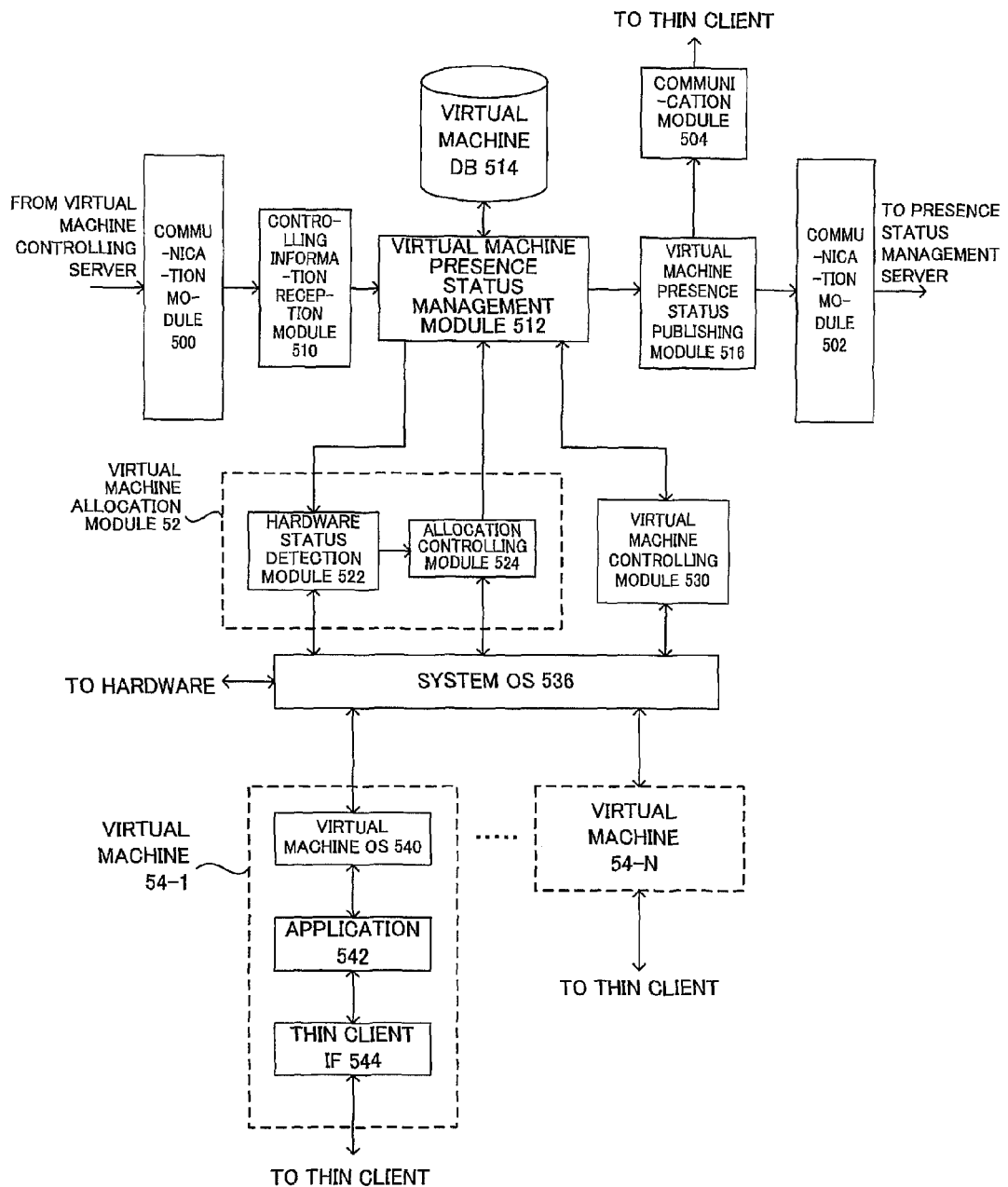

THIN CLIENT PROGRAM 60

CONTROLLER SYSTEM AND METHOD THEREFOR

CLAIM FOR PRIORITY

This patent application claims priority under 35 U.S.C. §119(a) on Patent Application No. 2007-017685 filed in Japan on Jan. 29, 2007, the entire contents of which are hereby incorporated by reference.

TECHNICAL FIELD

The embodiments of the present invention relate to a controller system and a method therefore.

BACKGROUND

Systems have been proposed that provide a presence service which provides information about the current state of a person, object or service. For example, the 3GPP TS 23.141 mobile communications standard provides a system architecture for a presence system, which is particularly used in cellular phone networks. However, none of these systems provide a control system that controls a controlled target.

SUMMARY

According to an embodiment of the present invention, a controller system is provided which controls a controlled target. The controller system includes a user status detection mechanism which detects status of a user of the controlled target; a controlled target status detection mechanism which detects status of the controlled target; and a control mechanism which controls the controlled target by mapping the detected status of the user and the detected status of the controlled target. The status of the controlled target includes multiple states, and the control mechanism controls the controlled target for each of the multiple states. The status of the user includes multiple states, and the control mechanism controls the controlled target by mapping the multiple states of the user status and the multiple states of the controlled target status. The controlled target in one embodiment is a virtual machine.

The controller system further includes multiple processing equipment which run the virtual machine and an allocation mechanism which performs processing for allocating the processing equipment to the virtual machine.

The allocation mechanism allocates the processing equipment according to usage rates of the respective processing equipment to the virtual machine.

The controller system further includes a processing equipment condition request mechanism which request a condition of the processing equipment that is allocated to the virtual machine, in which the allocation mechanism allocates the processing equipment to the virtual machine according to the condition requested by the processing equipment condition request mechanism.

The controller system further includes a virtual machine terminal for using the virtual machine, in which the virtual machine terminal is controlled according to the status of the virtual machine.

The controller system further includes a status display mechanism which displays the status of the controlled target.

The controller system further includes a user terminal which transmits the status of the user, in which the user terminal contains the status display mechanism.

A method of controlling a controlled target according to an embodiment of present invention includes a user status detection step of detecting status of a user of the controlled target; a controlled target status detection step of detecting status of the controlled target; and a controlling step of controlling the controlled target by mapping the detected status of the user and the detected status of the controlled target.

A controlling program for controlling a controlled target has a computer execute the following steps includes a user status detection step of detecting status of a user of the controlled target; a controlled target status detection step of detecting status of the controlled target; and a controlling step of controlling the controlled target by mapping the detected status of the user and the detected status of the controlled target.

BRIEF DESCRIPTION OF THE DRAWINGS

FIG. 15 is a diagram showing an example of virtual machine controlling logics data which is stored in a virtual machine controlling logics DB, according to an embodiment;

FIG. 16 is a diagram showing a configuration of a virtual machine management program which is run on the virtual machine management equipment shown in FIG. 1, according to an embodiment;

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Figure 1:
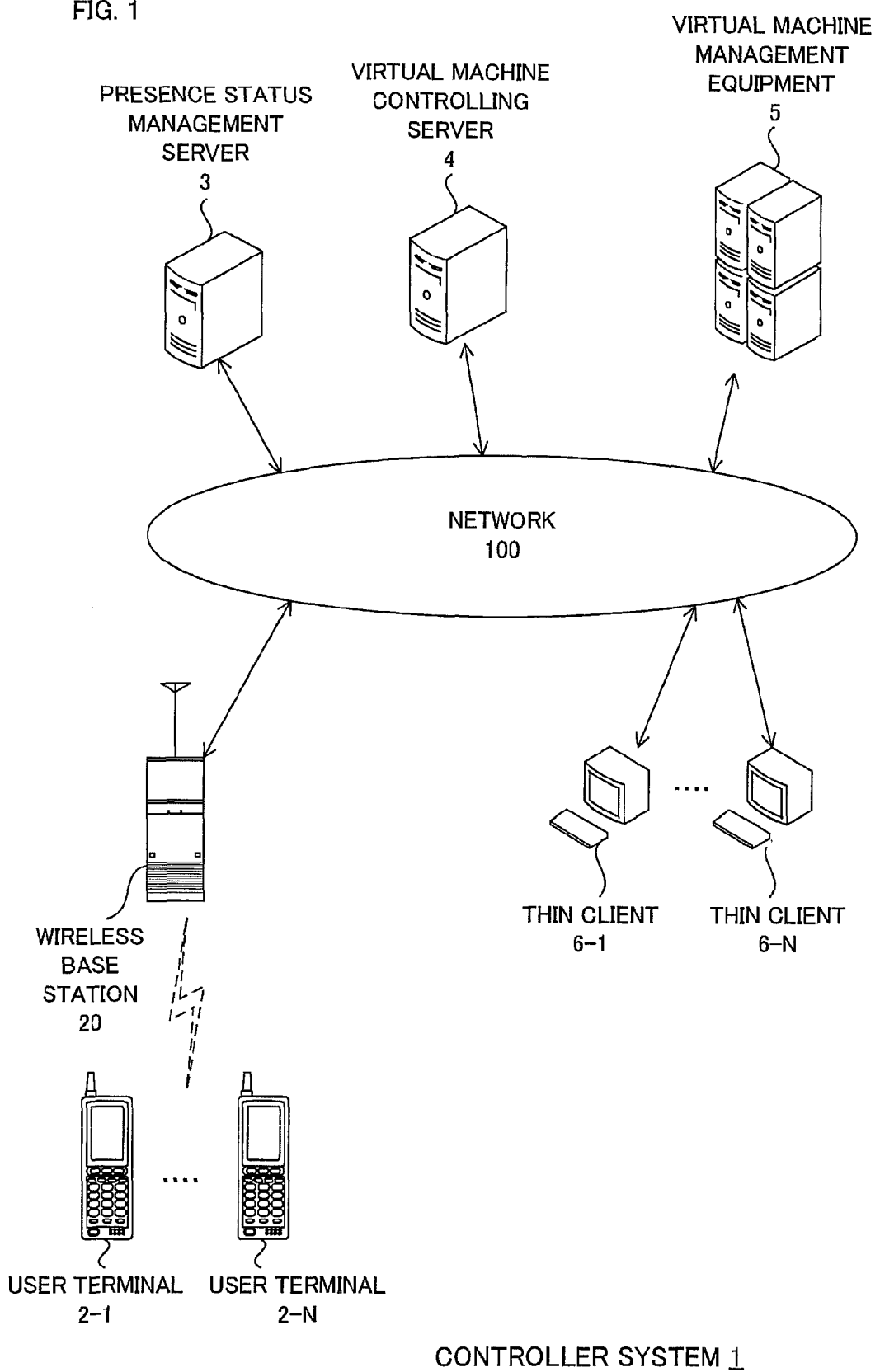
FIG. 1 is a diagram showing an embodiment of a configuration of a controller system to which a controlling method according to an embodiment of the present invention is applied.

FIG. 1 is a diagram showing by way of example the configuration of a controller system 1 to which a control method according to the embodiment of the present invention is applied.

As shown in FIG. 1, the controller system 1 is structured by connecting a wireless base station 20, which communicates with user terminals 2-1 to 2-N such as cellular phones (N is an integer equal to or larger than 1. N is not always the same number), a presence status management server 3, a virtual machine controlling server 4, a virtual machine management equipment 5, and thin clients 6-1 to 6-N to one another via a network 100.

In the following description, any one of the user terminals 2-1 to 2-N may simply be referred to as user terminal 2 when there is no need to specify which one, and the same applies to other multiple components.

Also, the presence status management server 3 and other devices that can take the lead in information processing and communication may collectively be referred to as nodes in the following description.

Any two or more of the devices that constitute the controller system 1 shown in FIG. 1 can be structured unitarily if it is preferred.

The accompanying drawings employ the same reference numerals for components that are substantially the same and for processing steps that are substantially the same.

Figure 2:
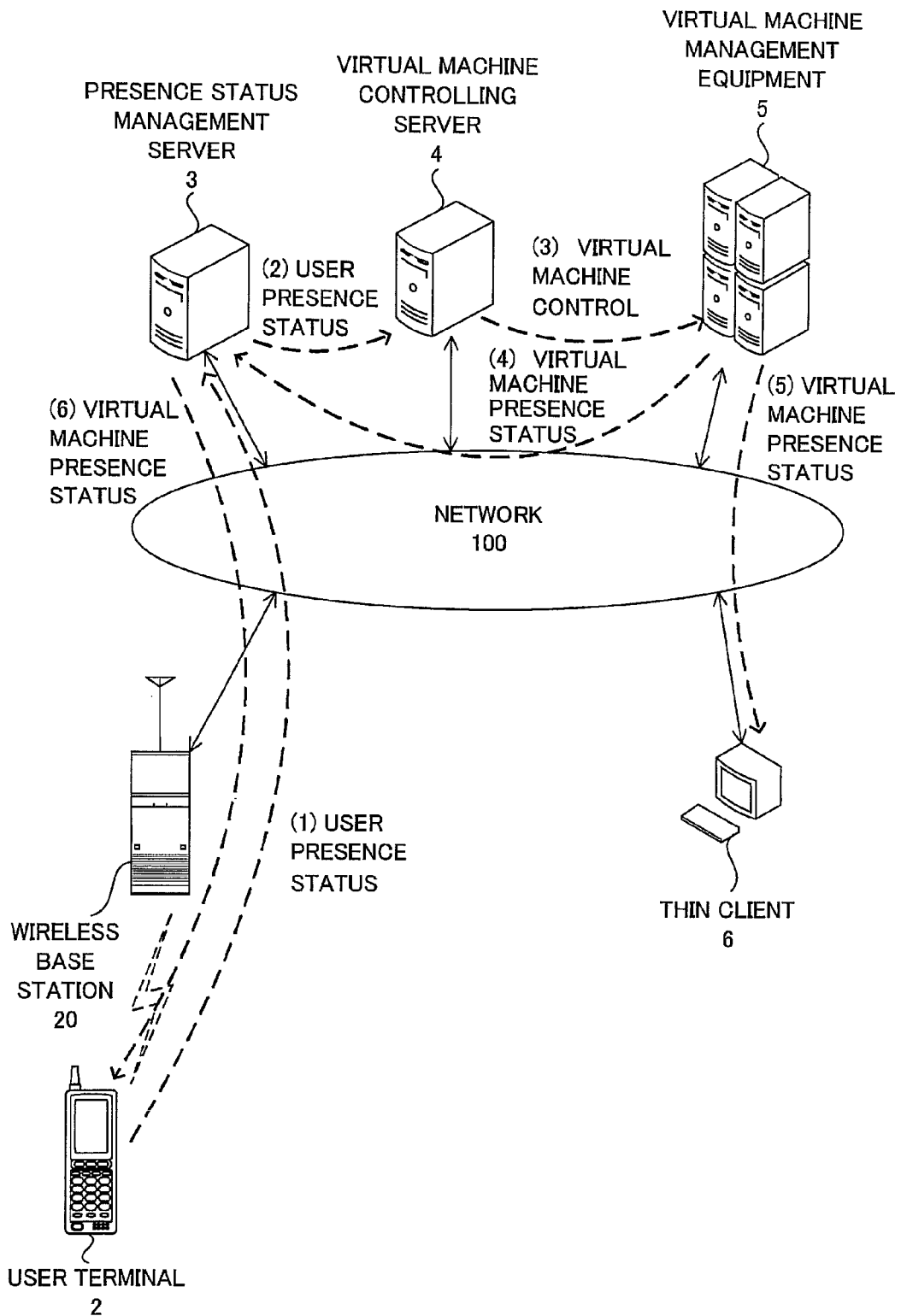
FIG. 2 is a diagram showing a mode of virtual machine control that is performed among a user terminal, a presence status management server, a virtual machine controlling server, a virtual machine management equipment, and a thin client in the controller system which is shown in FIG. 1, according to an embodiment.

FIG. 2 is a diagram showing a mode of virtual machine control that is performed among the user terminal 2, the presence status management server 3, the virtual machine controlling server 4, the virtual machine management equipment 5, and the thin client 6.

As illustrated in FIG. 2, in the controller system 1, the virtual machine is controlled in the mode as shown below.

(1) The presence status management server 3 detects through the user terminal 2 information that indicates the status of a user who is using the user terminal 2 (user presence status).

(2) The presence status management server 3 sends the detected user presence status to the virtual machine controlling server 4.

(3) Based on the received user presence status, the virtual machine controlling server 4 accesses the virtual machine management equipment 5 and controls a virtual machine.

(4) The presence status management server 3 detects through the virtual machine management equipment 5 information that indicates the status of the virtual machine (virtual machine presence status).

(5) The virtual machine management equipment 5 sends the virtual machine presence status to the thin client 6.

(6) The presence status management server 3 sends the detected virtual machine presence status to the user terminal 2.

The presence status management server 3, which, in this embodiment, detects the user presence status through the user terminal 2, may obtain the user presence status through other components such as an ID card reader.

The wireless base station 20, the presence status management server 3, the virtual machine controlling server 4, the virtual machine management equipment 5, and the thin client 6 may not be in the same network.

For instance, the thin client 6 may be connected to the virtual machine management equipment 5 via an intra-organizational network.

Figure 3:
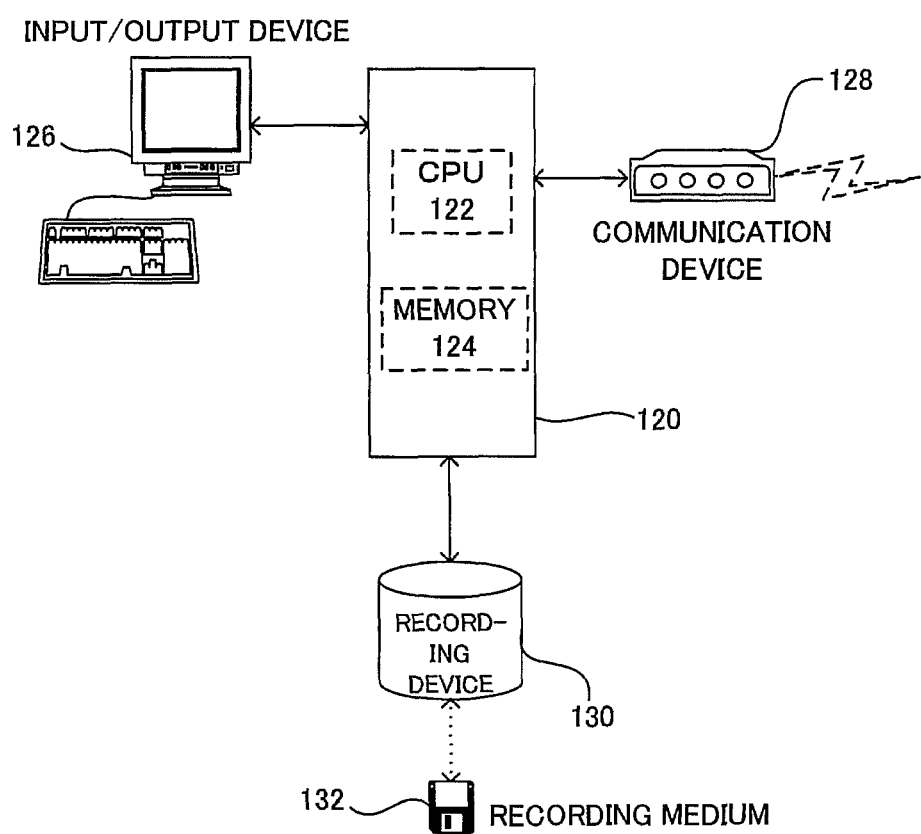
FIG. 3 is a diagram showing an example of a hardware configuration of the presence status management server and the virtual machine controlling server shown in FIG. 1, according to an embodiment.

FIG. 3 is a diagram showing an example of the hardware configuration of the presence status management server 3 and virtual machine controlling server 4 shown in FIG. 1.

As illustrated in FIG. 3, the presence status management server 3 and the virtual machine controlling server 4 each include a main body 120, which contains a CPU 122, a memory 124, and the like, an input/output device 126, which contains a keyboard, a display, and the like, a communication device 128, which communicates with other nodes, and a recording device 130, which records and reproduces data in a recording medium 132, such as a CD device or an HDD device.

In short, the presence status management server 3 and the virtual machine controlling server 4 have the hardware components of a computer that is capable of processing information and communicating with other nodes.

Figure 4:
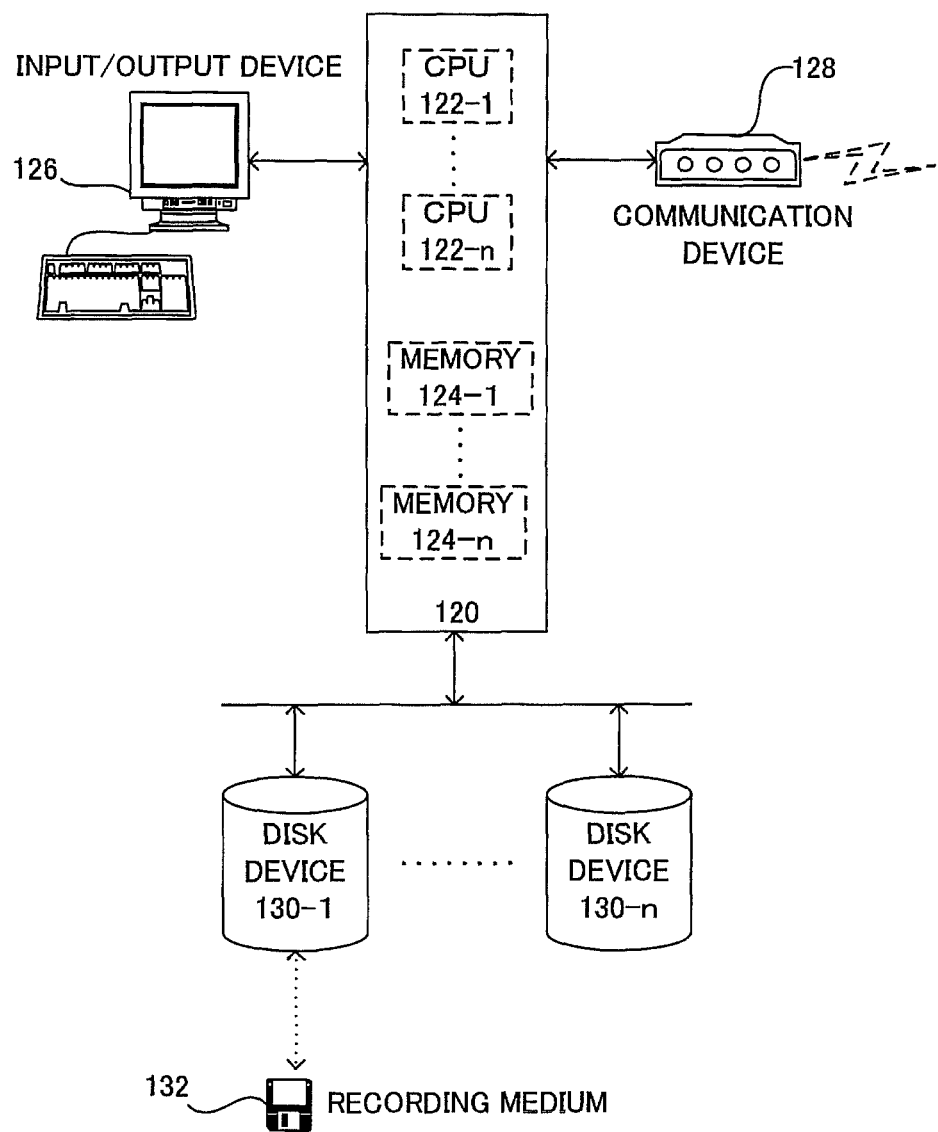
FIG. 4 is a diagram showing an example of a hardware configuration of the virtual machine management equipment shown in FIG. 1, according to an embodiment.

FIG. 4 is a diagram showing an example of the hardware configuration of the virtual machine management equipment 5 shown in FIG. 1.

As illustrated in FIG. 4, the virtual machine management equipment 5 includes a main body 120, which contains CPUs 122-1 to 122-$n$ (n is an integer equal to or larger than 1. n is not always the same number), memories 124-1 to 124-$n$, and the like, an input/output device 126, a communication device 128, and disk devices 130-1 to 130-$n$, which record and reproduce data in a recording medium 132.

In short, the virtual machine management equipment 5 has the hardware components of a computer that is capable of processing information and communicating with other nodes.

Figure 5:
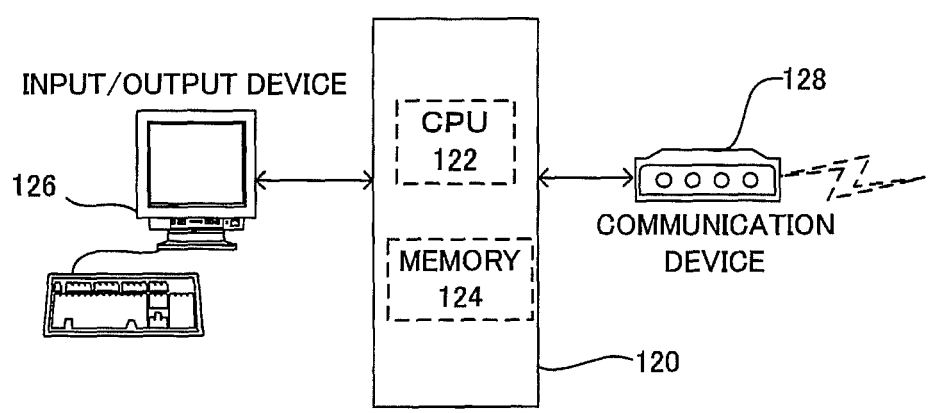
FIG. 5 is a diagram showing an example of a hardware configuration of the thin client shown in FIG. 1, according to an embodiment.

FIG. 5 is a diagram showing an example of the hardware configuration of the thin client 6 shown in FIG. 1.

As illustrated in FIG. 5, the thin client 6 includes a main body 120, which contains a CPU 122, a memory 124, and the like, an input/output device 126, and a communication device 128.

In short, the thin client 6 has the hardware components of a computer that is capable of processing information and communicating with other nodes.

The hardware configuration of the presence status management server 3 and the virtual machine controlling server 4 does not always need to contain one CPU 122 and one memory 124 as shown in FIG. 3, but may have multiple CPUs 122 and multiple memories 124 as shown in FIG. 4.

The hardware configuration of the thin client 6 does not always need to be in the configuration as shown in FIG. 5, but may contain some type of recording device 130 and recording medium 132 as shown in FIG. 4.

Figure 6:
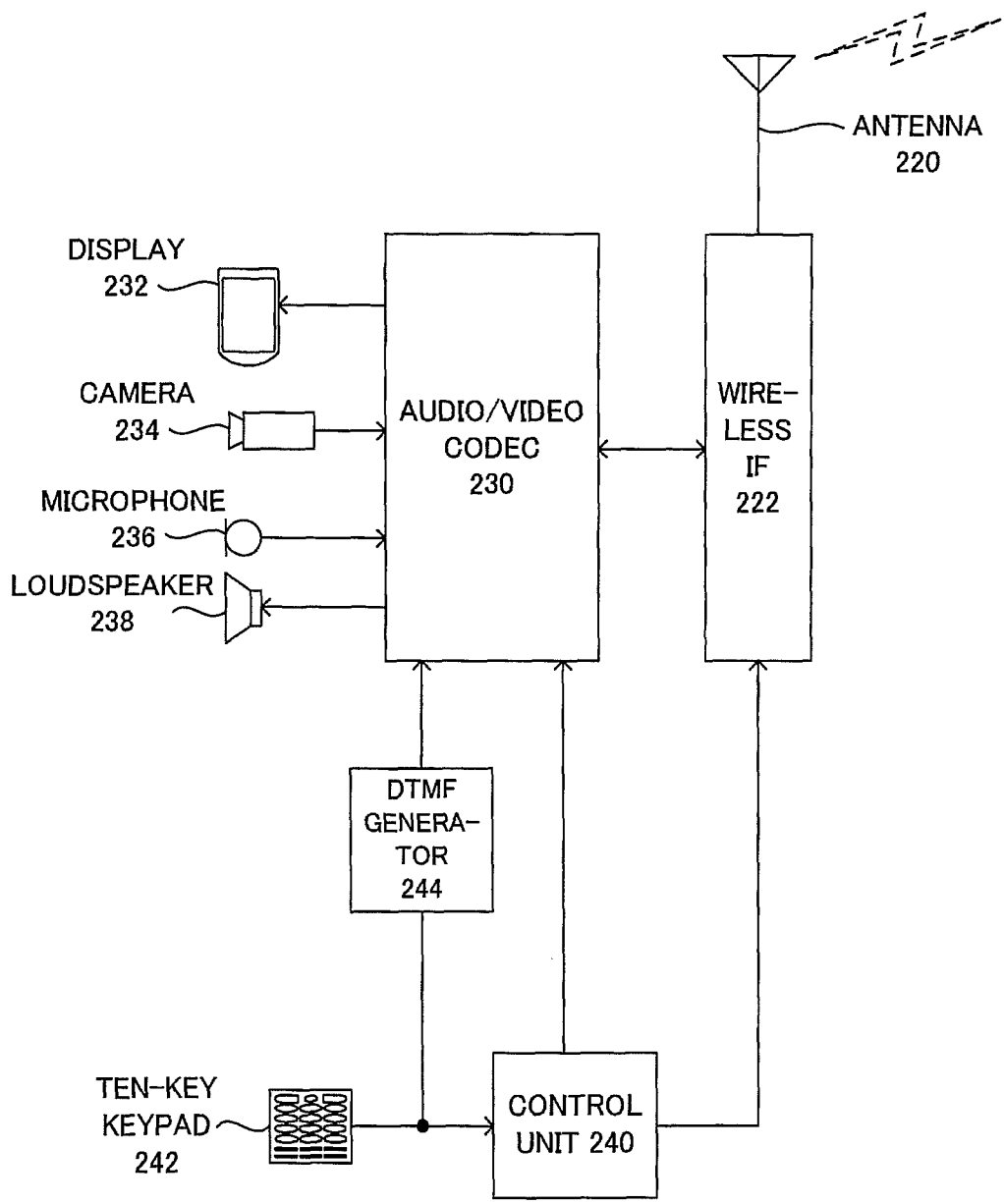
FIG. 6 is a diagram showing an example of a configuration of the user terminal shown in FIG. 1, according to an embodiment.

FIG. 6 is a diagram showing an example of the configuration of the user terminal 2 shown in FIG. 1.

As illustrated in FIG. 6, the user terminal 2 includes an antenna 220, a wireless interface (IF) 222, an audio/video CODEC 230, a display 232 such as an LCD, a camera 234, a microphone 236, a loudspeaker 238, a control unit 240, a ten-key keypad 242, and a Dial Tone Multi Frequency (DTMF) generator 244.

The components of the user terminal 2 may be implemented by dedicated hardware, or may be implemented by software run by a Digital Signal Processor (DSP) or the like.

The antenna 220 and the wireless IF 222 exchange signals necessary to set up a line with the wireless base station 20.

The antenna 220 and the wireless IF 222 also exchange audio, video, and DTMF signals with other user terminals 2 or other nodes via the wireless base station 20 and the network 100.

The display 232 is, for example, a liquid crystal display device, and displays video images generated by the audio/video CODEC 230 to present the images to the user.

The camera 234 is, for example, a CCD camera, and takes a picture of the user, scenery, or the like to generate video images and output the images to the audio/video CODEC 230.

The microphone 236 picks up audio such as the voice of the user and outputs the picked audio to the audio/video CODEC 230.

The loudspeaker 238 outputs audio that is input from the audio/video CODEC 230, for example, the voice of the person on the other end of the phone line or sounds accompanying service information.

The ten-key keypad 242 has buttons for numbers 0 to 9 and symbols "*," "#," and the like suitable for signal input operation through DTMF. When operated by the user, the ten-key keypad 242 outputs signals to the control unit 240 and the DTMF generator 244.

The control unit 240 contains a not-shown CPU, memory, and the like. Receiving a signal from the ten-key keypad 242, the control unit 240 executes a program like the one described later with reference to FIG. 7.

The control unit 240 performs processing for communication with the wireless base station 20, and outputs signals for the communication to the wireless IF 222.

The control unit 240 also performs processing for controlling the components of the user terminal 2, and outputs signals for the control to the audio/video CODEC 230.

The DTMF generator 244 generates DTMF signals corresponding to the respective number buttons 0 to 9 and symbol buttons "*" and "#" on the ten-key keypad 242 according to the operation of the user, and outputs the DTMF signals to the audio/video CODEC 230.

The audio/video CODEC 230 receives via the wireless IF 222 video data sent from other user terminals 2 and other nodes in, for example, the MPEG format, decodes the data, and displays the decoded data on the display 232.

The audio/video CODEC 230 also decodes audio data sent from other user terminals 2 and other nodes, and outputs the decoded audio data from the loudspeaker 238.

The audio/video CODEC 230 encodes video images input from the camera 234 to obtain MPEG format video data, and outputs the video data to the wireless IF 222.

The audio/video CODEC 230 encodes sounds input from the microphone 236 and DTMF signals input from the DTMF generator 244 to obtain audio data, and outputs the audio data to the wireless IF 222.

In short, the user terminals 2 have hardware components that enables the user terminals 2 to exchange audio, video, and DTMF signals with other nodes.

Figure 7:
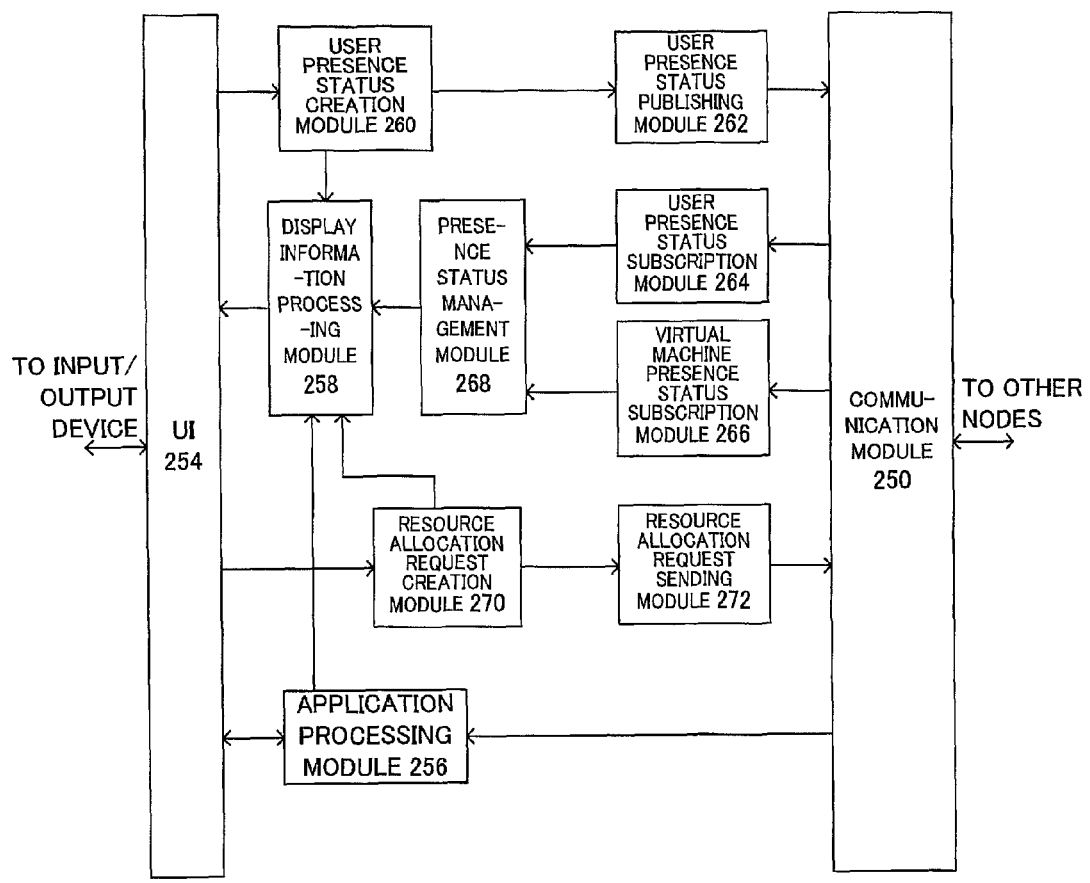
FIG. 7 is a diagram showing a configuration of a user terminal program which is run on the user terminal shown in FIG. 1, according to an embodiment.

FIG. 7 is a diagram showing the configuration of a user terminal program 20, which is run on the user terminal 2 shown in FIG. 1.

As illustrated in FIG. 7, the user terminal program 20 includes a communication module 250, a user interface (UI) module 254, an application processing module 256, a display information processing module 258, a user presence status creation module 260, a user presence status publishing module 262, a user presence status subscription module 264, a virtual machine presence status subscription module 266, a presence status management module 268, a resource allocation request creation module 270, and a resource allocation request sending module 272.

In the user terminal program 20, the communication module 250 performs processing necessary to communicate with other nodes over the network 100.

The UI module 254 receives signals generated as the user operates the ten-key keypad 242 or other input/output device, and outputs the signals to the application processing module 256, the user presence status creation module 260, and the resource allocation request creation module 270. The UI module 254 also controls processing of other components of the user terminal program 20.

The application processing module 256 performs processing necessary to execute an application program installed in the user terminal 2.

The display information processing module 258 receives data from other components of the user terminal program 20, performs processing for displaying a given screen on the display 232, and outputs the processed data to the UI module 254.

The user presence status creation module 260 receives the operation signals of the user from the UI module 254 and creates the user presence status.

For instance, when current status of the user is "at home," the user enters a keyword indicating "at home" or chooses "at home" from a selection screen to create the user presence status.

The user presence status creation module 260 outputs the created user presence status to the user presence status publishing module 262.

The user presence status publishing module 262 sends the user presence status received from the user presence status creation module 260 to the presence status management server 3 via the communication module 250 and the network 100.

Figure 8:
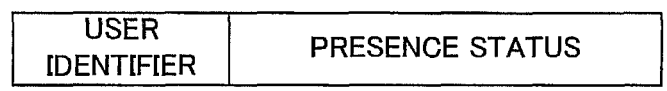
FIG. 8 is a diagram showing an example of a configuration of user presence status, according to an embodiment.

FIG. 8 is a diagram showing an example of the configuration of the user presence status.

As shown in FIG. 8, the user presence status contains the identifier of a user (user identifier) and presence status indicating the status of the user.

The user presence status subscription module 264 shown in FIG. 7 receives the user presence status from the presence status management server 3 via the communication module 250 and the network 100, and outputs the received presence status to the presence status management module 268.

The virtual machine presence status subscription module 266 receives the virtual machine presence status from the presence status management server 3 via the communication module 250 and the network 100, and outputs the received presence status to the presence status management module 268.

Figure 9:
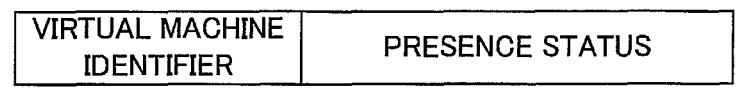
FIG. 9 is a diagram showing an example of a configuration of virtual machine presence status, according to an embodiment.

FIG. 9 is a diagram showing an example of the configuration of the virtual machine presence status.

As shown in FIG. 9, the virtual machine presence status contains the identifier of a virtual machine (virtual machine identifier) and presence status indicating the status of the virtual machine.

The presence status management module 268 shown in FIG. 7 manages the user presence status sent from the user presence status subscription module 264 and the virtual machine presence status sent from the virtual machine presence status subscription module 266, and outputs the presence status to the display information processing module 258 as the need arises.

The display information processing module 258 performs processing for displaying the user presence status and virtual machine presence status sent from the presence status management module 268 on the display 232, and outputs the processed data to the UI module 254.

Figure 10:
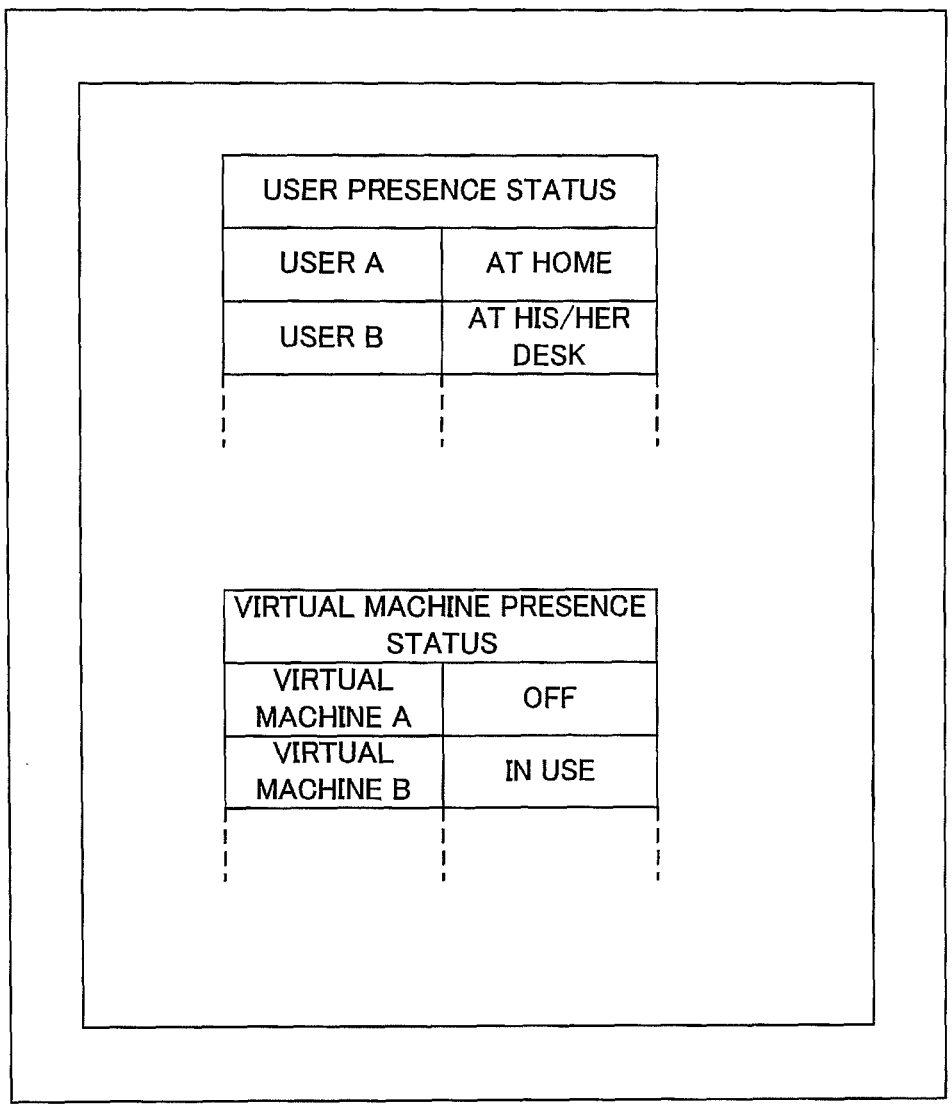
FIG. 10 is a diagram showing an example of a screen displayed on a display, according to an embodiment.

FIG. 10 is a diagram showing an example of a screen displayed on the display 232.

As shown in FIG. 10, processing by the display information processing module 258 causes the display 232 to display the user presence status and the virtual machine presence status.

The display 232 can also display, as shown in FIG. 10, the presence status of multiple users and the presence status of multiple virtual machines other than the presence status of user of its own user terminal 2 and the presence status of the virtual machine of its own user terminal 2.

In the example of FIG. 10, the display 232 shows that the status of the user A is "at home," the status of the user B is "at his/her desk" (at his/her desk in the office where the user B works), the status of the virtual machine A is "OFF," and the status of the virtual machine B is "in use."

The resource allocation request creation module 270 shown in FIG. 7 receives operation of the user signals from the UI module 254 and creates a resource allocation request.

For instance, to make a request for the allocation of a processing equipment capable of quick integer calculation to the virtual machine that he/she is using, the user operates the virtual machine such that a processing equipment quick in integer calculation is chosen, and the resource allocation request is thus created.

The resource allocation request creation module 270 outputs the created resource allocation request to the resource allocation request sending module 272.

The resource allocation request sending module 272 sends the resource allocation request received from the resource allocation request creation module 270 to the virtual machine controlling server 4 via the communication module 250 and the network 100.

Figure 11:
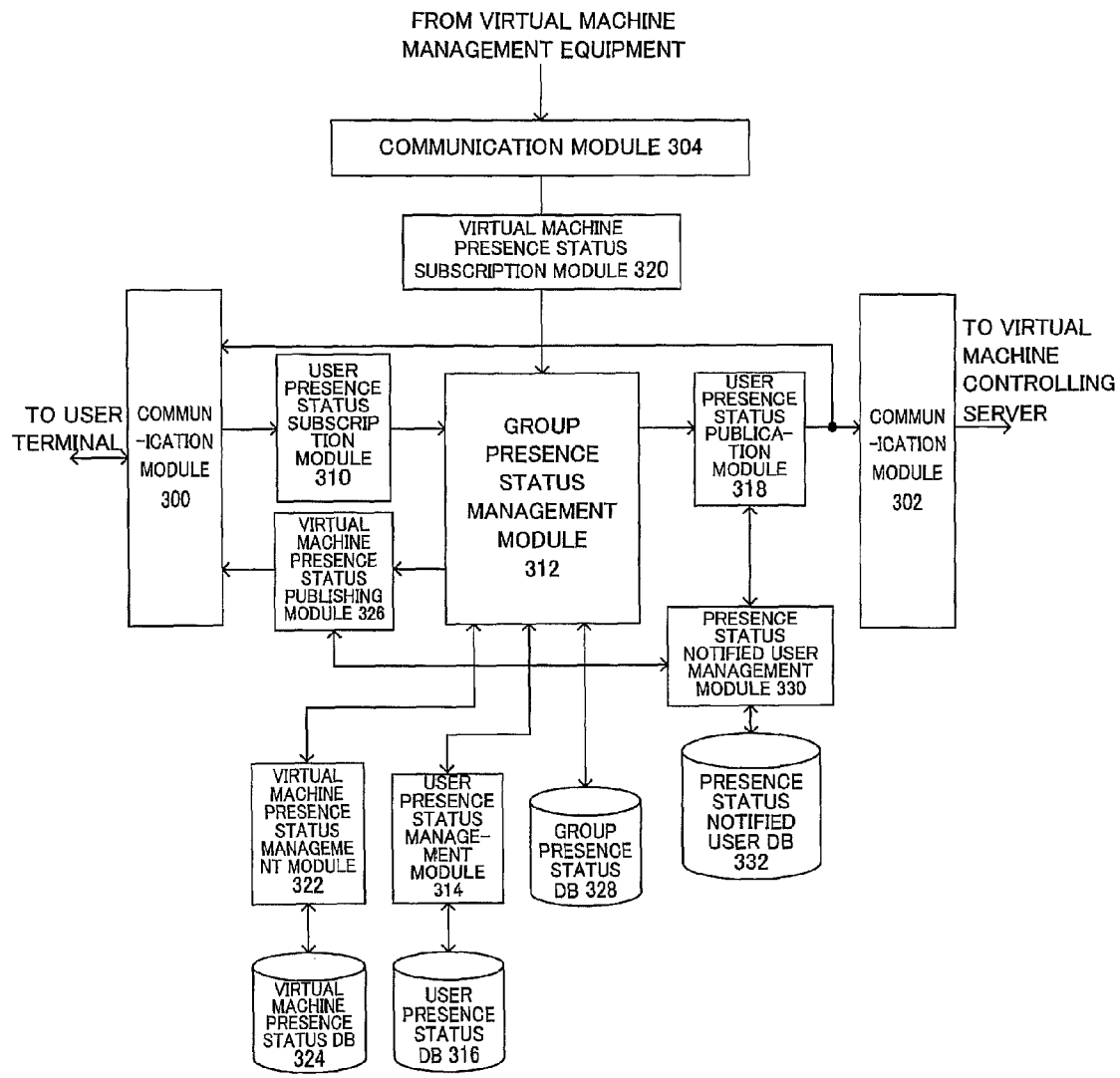
FIG. 11 is a diagram showing a configuration of a presence status management program which is run on the presence status management server shown in FIG. 1, according to an embodiment.

FIG. 11 is a diagram showing the configuration of a presence status management program 30, which is run on the presence status management server 3 shown in FIG. 1.

As illustrated in FIG. 11, the presence status management program 30 includes communication modules 300, 302, and 304, a user presence status subscription module 310, a group presence status management module 312, a user presence status management module 314, a user presence status database (DB) 316, a user presence status publishing module 318, a virtual machine presence status subscription module 320, a virtual machine presence status management module 322, a virtual machine presence status DB 324, a virtual machine presence status publishing module 326, a group presence status DB 328, a presence status notified user management module 330, and a presence status notified user DB 332.

The presence status management program 30 is supplied to the presence status management server 3 through, for example, the recording medium 132 shown in FIG. 3 and loaded onto the memory 124 to be run on an OS installed in the presence status management server 3 (the OS is not shown in the drawings). Hardware resource of the presence status management server 3 are used in a specific manner in running the presence status management program 30 (the same applies to the following software components).

In the presence status management program 30, the communication module 300 performs processing necessary to communicate with the user terminal 2 over the network 100.

The communication module 302 performs processing necessary to communicate with the virtual machine controlling server 4 over the network 100.

The communication module 304 performs processing necessary to communicate with the virtual machine management equipment 5 over the network 100.

The user presence status subscription module 310 receives the user presence status from the user terminal 2 via the communication module 300 and the network 100, and outputs the received presence status to the group presence status management module 312.

The groups presence status management module 312 manages the user presence status and the virtual machine presence status as a group, and stores group presence status, which will be described later with reference to FIG. 12, in the group presence status DB 328.

Figures 12, 13:
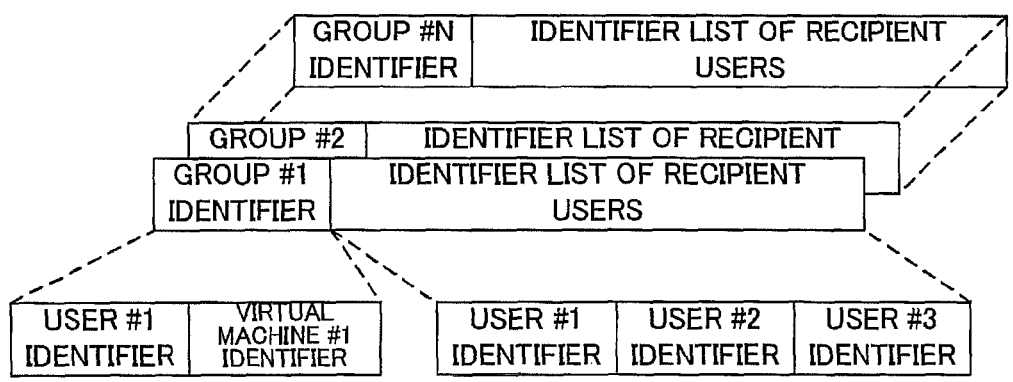
FIG. 12 is a diagram showing an example of a configuration of group presence status, according to an embodiment.
FIG. 13 is a diagram showing an example of a user identifier list which is stored in a presence status notified user DB to show to which users the presence status should be sent, according to an embodiment.

FIG. 12 is a diagram showing an example of the configuration of the group presence status.

As shown in FIG. 12, the group presence status contains the identifier of each group (group identifier) and a user identifier and a virtual machine identifier that constitute the group.

The example of FIG. 12 shows that Group #1 is constituted of User #1 and Virtual Machine #1, Group #2 is constituted of User #2 and Virtual Machine #2, and Group #N is constituted of User #N and Virtual Machine #N.

The group presence status management module 312 shown in FIG. 11 outputs the user presence status received from the user presence status subscription module 310 to the user presence status management module 314 and the user presence status publishing module 318.

The group presence status management module 312 obtains from the group presence status DB 328 a virtual machine identifier that constitutes a group to which the user associated with the output user presence status belongs, and outputs the obtained virtual machine identifier to the user presence status publishing module 318.

The user presence status management module 314 stores the user presence status received from the group presence status management module 312 in the user presence status DB 316, and manages the stored user presence status.

The user presence status management module 314 outputs the user presence status stored in the user presence status DB 316 to the group presence status management module 312 as the need arises.

The user presence status publishing module 318 outputs the user presence status received from the group presence status management module 312 to the presence status notified user management module 330, and requests the identifier of a user to which this user presence status is to be sent.

The presence status notified user management module 330 stores and manages in the presence status notified user DB 332 the identifiers of one or more users to which the presence status of the respective users and the presence status of the respective virtual machines are to be sent.

The presence status notified user management module 330 outputs a user identifier stored in the presence status notified user DB 332 to the user presence status publishing module 318 and the virtual machine presence status publishing module 326 as the need arises.

FIG. 13 is a diagram showing an example of a user identifier list which is stored in the presence status notified DB 332 to show to which users the presence status should be sent.

As illustrated in FIG. 13, the user identifier list of users to which the presence status should be sent contains the identifier of a group and a list of the identifiers of users who should receive the presence status information of the user and the virtual machine that constitute the group.

The example of FIG. 13 shows that users who should send the presence status of User #1 and Virtual Machine #1 constituting Group #1 are Users #1, #2, and #3.

The user presence status publishing module 318 shown in FIG. 11 obtains from the presence status notified user management module 330 the identifier of a user to which the user presence status is to be sent.

Further, the user presence status publishing module 318 sends the user presence status via the communication module 300 and the network 100 to the user terminal 2 of a user identified by the obtained user identifier.

In the example of FIG. 13, the user presence status of User #1 is sent to the user terminals 2 of Users #1, #2, and #3.

The user presence status publishing module 318 also sends the user presence status and a virtual machine identifier to the virtual machine controlling server 4 via the communication module 302 and the network 100.

The virtual machine presence status subscription module 320 receives the virtual machine presence status from the virtual machine management equipment 5 via the communication module 304 and the network 100, and outputs the received presence status to the group presence status management module 312.

The group presence status management module 312 outputs the virtual machine presence status received from the virtual machine presence status subscription module 320 to the virtual machine presence status management module 322 and the virtual machine presence status publishing module 326.

The virtual machine presence status management module 322 stores the virtual machine presence status received from the group presence status management module 312 in the virtual machine presence status DB 324, and manages the stored presence status.

The virtual machine presence status management module 322 also outputs the virtual machine presence status stored in the virtual machine presence status DB 324 to the group presence status management module 312 as the need arises.

The virtual machine presence status publishing module 326 outputs the virtual machine presence status received from the group presence status management module 312 to the presence status notified user management module 330, requests the identifier of a user to which this virtual machine presence status is to be sent, and obtains the user identifier.

The virtual machine presence status publishing module 326 then send the virtual machine presence status via the communication module 300 and the network 100 to the user terminal 2 of a user identified by the obtained user identifier.

In the example of FIG. 13, the virtual machine presence status of Virtual Machine #1 is sent to the user terminals 2 of Users #1, #2, and #3.

Figure 14:
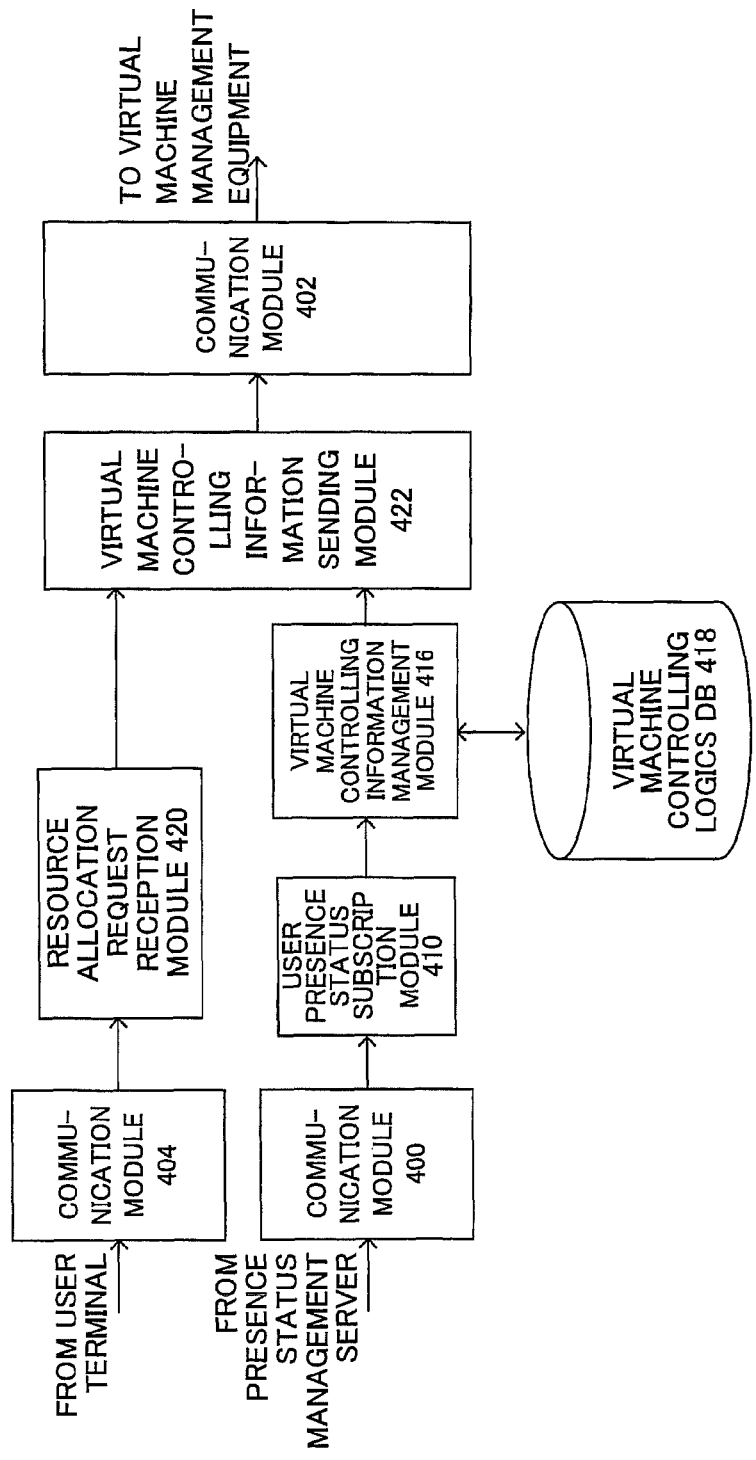
FIG. 14 is a diagram showing a configuration of a virtual machine controlling program which is run on the virtual machine controlling server shown in FIG. 1, according to an embodiment.

FIG. 14 is a diagram showing the configuration of a virtual machine controlling program 40, which is run on the virtual machine controlling server 4 shown in FIG. 1.

As illustrated in FIG. 14, the virtual machine controlling program 40 includes communication modules 400, 402, and 404, a user presence status subscription module 410, a virtual machine controlling information management module 416, a virtual machine controlling logics DB 418, a resource allocation request reception module 420, and a virtual machine controlling information sending module 422.

In the virtual machine controlling program 40, the communication module 400 performs processing necessary to communicate with the presence status management server 3 over the network 100.

The communication module 402 performs processing necessary to communicate with the virtual machine management equipment 5 over the network 100.

The communication module 404 performs processing necessary to communicate with the user terminal 2 over the network 100.

The user presence status subscription module 410 receives the user presence status and a virtual machine identifier from the presence status management server 3 via the communication module 400 and the network 100, and outputs the received presence status and identifier to the virtual machine controlling information management module 416.

The virtual machine controlling information management module 416 stores virtual machine controlling logic for controlling a virtual machine in the virtual machine controlling logics DB 418, and manages the stored logic.

FIG. 15 is a diagram showing an example of virtual machine controlling logics data which is stored in the virtual machine controlling logics DB 418.

As shown in FIG. 15, virtual machine controlling logics data contains control logic for controlling Virtual Machines #1 to #N (Virtual Machine #1~#N controlling logic).

The control logic of each virtual machine contains the state of the presence status of a user constituting a group to which the virtual machine belongs and information indicating how the virtual machine is controlled according to the state of the user presence status.

In the example shown in FIG. 15, the Virtual Machine #1 controlling logic is as follows:

(1) State 1

Virtual Machine #1 is controlled to reach "getting ready" status when the status of User #1 is changed to "not at home." However, Virtual Machine #1 reaches the "getting ready" status only when it is judged from the time at which the change to "not at home" occurs when User #1 is on his way to work.

The status "Getting ready" means that an image of Virtual Machine #1 which is stored in, for example, the disk device 130 of the virtual machine management equipment 5 is read onto the memory 124.

(2) State 2

Virtual Machine #1 is controlled to reach "power ON" status when the status of User #1 is changed to "arrived at work."

"Power on" means that processing of activating Virtual Machine #1 is started as in, for example, powering on a normal PC.

(3) State 3

Virtual Machine #1 is controlled to reach "ready" status when the status of User #1 is changed to "at his/her desk."

Here, "Ready" means that Virtual Machine #1 has completed all of the activation processing and is waiting to be accessed by the thin client 6.

When accessed by the thin client 6 after the above processing, the status of Virtual Machine #1 changes to "in use."

(4) State 4

Virtual Machine #1 is controlled to reach "on standby" status when the status of User #1 is changed to "not at his/her desk." However, Virtual Machine #1 is brought to the "on standby" status after a given period of time elapses since the change to "not at his/her desk" occurs.

Here, the status "On standby" means that Virtual Machine #1 enters a sleep mode in order to reduce the power consumption of hardware allocated to Virtual Machine #1 and of the thin client 6.

(5) State 5

Virtual Machine #1 is controlled to reach "shut down" status when the status of User #1 is changed to "left work." However, Virtual Machine #1 is brought to the "shut down" status after a given period of time elapses since the change to "left work" occurs.

Here, the status "Shut down" means that processing of shutting down Virtual Machine #1 is started as in, for example, powering off a normal PC, and the shutdown processing includes processing of saving the settings, offline processing, and the like.

When the virtual machine management equipment 5 evacuates the image of Virtual Machine #1 from the memory 124 to the disk device 130 after Virtual Machine #1 reaches the "shut down" status, the status of Virtual Machine #1 is changed to "Off."

The virtual machine controlling information management module 416 shown in FIG. 14 receives the user presence status and a virtual machine identifier from the user presence status subscription module 410, and obtains from the virtual machine controlling logics DB 418 controlling information that is associated with the received user presence status and virtual machine identifier (virtual machine controlling information).

For instance, when the user presence status is "not at home" and the received virtual machine identifier is #1, the virtual machine controlling information management module 416 obtains information for controlling Virtual Machine #1 such that Virtual Machine #1 reaches the "getting ready" status.

The resource allocation request reception module 420 receives a resource allocation request from the user terminal 2 via the communication module 404 and the network 100, and outputs the received request to the virtual machine controlling information sending module 422.

The virtual machine controlling information sending module 422 sends virtual machine controlling information received from the virtual machine controlling information management module 416 and a resource allocation request received from the resource allocation request reception module 420 to the virtual machine management equipment 5 via the communication module 402 and the network 100.

FIG. 16 is a diagram showing the configuration of a virtual machine management program 50, which is run on the virtual machine management equipment 5 shown in FIG. 1.

As illustrated in FIG. 16, the virtual machine management program 50 includes communication modules 500, 502, and 504, a controlling information reception module 510, a virtual machine status management module 512, a virtual machine DB 514, a virtual machine presence status publishing module 516, a virtual machine allocation module 52, a virtual machine controlling module 530, a system OS 536, and virtual machines 54-1 to 54-N.

In the virtual machine management program 50, the communication module 500 performs processing necessary to communicate with the virtual machine controlling server 4 over the network 100.

The communication module 502 performs processing necessary to communicate with the presence status management server 3 over the network 100.

The communication module 504 performs processing necessary to communicate with the thin client 6 over the network 100.

The controlling information reception module 510 receives virtual machine controlling information containing a virtual machine identifier and a resource allocation request from the virtual machine controlling server 4 via the communication module 500 and the network 100, and outputs the received information and request to the virtual machine presence status management module 512.

The virtual machine presence status management module 512 manages the status of the virtual machine 54 and stores information related to the virtual machine 54 in the virtual machine DB 514.

Further, the virtual machine presence status management module 512 outputs virtual machine controlling information and a resource allocation request that are received from the controlling information reception module 510 to the virtual machine allocation module 52.

The virtual machine presence status management module 512 also receives the identifier of the virtual machine 54 and the identifier of hardware allocated to the virtual machine 54 from the virtual machine allocation module 52, and stores the identifiers in the virtual machine DB 514.

In a case where hardware has already been allocated to the virtual machine that is associated with the virtual machine controlling information received from the controlling information reception module 510, the virtual machine presence status management module 512 outputs the received virtual machine controlling information to the virtual machine controlling module 530.

The virtual machine presence status management module 512 receives the virtual machine presence status from the virtual machine controlling module 530, and stores the received presence status in the virtual machine DB 514.

The virtual machine presence status management module 512 also outputs the virtual machine presence status received from the virtual machine controlling module 530 to the virtual machine presence status publishing module 516.

The virtual machine presence status publishing module 516 sends the virtual machine presence status received from the virtual machine presence status management module 512 to the presence status management server 3 via the communication module 502 and the network 100.

The virtual machine presence status publishing module 516 also sends the virtual machine presence status received from the virtual machine presence status management module 512 to the thin client 6 via the communication module 504 and the network 100.

The virtual machine allocation module 52 includes a hardware status detection module 522 and an allocation controlling module 524.

The virtual machine allocation module 52 uses these components to perform processing of allocating hardware to the virtual machine 54.

In the virtual machine allocation module 52, the hardware status detection module 522 receives a resource allocation request from the virtual machine presence status management module 512.

The hardware status detection module 522 obtains from the system OS 536 information related to the status of hardware to be allocated to the virtual machine 54 (hardware status information).

The hardware status information contains resource information, which indicates the performance of the CPU 122 and the memory, and usage rate information, which indicates the usage rates of the CPU 122 and the memory.

The hardware status detection module 522 chooses hardware to be allocated based on the obtained resource information and usage rate information and the received resource allocation request as well, and outputs the identifier of the chosen hardware to the allocation controlling module 524.

For instance, when the received resource allocation request requests for a processing equipment capable of quick integer calculation, the hardware status detection module 522 chooses hardware that is quick in integer calculation.

When no resource allocation request is received, the hardware status detection module 522 chooses arbitrary hardware that can be allocated.

The allocation controlling module 524 performs processing of allocating, via the system OS 536, hardware that is chosen by the hardware status detection module 522 to the virtual machine 54 that is identified by a virtual machine identifier received from the virtual machine presence status management module 512.

Further, the allocation controlling module 524 outputs the identifiers of the hardware and virtual machine 54 allocated to each other through the allocation processing to the virtual machine presence status management module 512.

The virtual machine controlling module 530 performs processing for controlling the virtual machine 54 via the system OS 536 according to virtual machine controlling information that is received from the virtual machine presence status management module 512.

Further, the virtual machine controlling module 530 outputs the virtual machine presence status that reflects the status of the virtual machine 54 after the above processing to the virtual machine presence status management module 512.

The virtual machine 54 includes a virtual machine OS 540, an application module 542, and a thin client IF 544.

In the virtual machine 54, the virtual machine OS 540 has functions of an OS for operating the virtual machine 54, which is run on the system OS 536.

The application module 542 is run on the virtual machine OS 540 to perform processing for executing an application program installed in the virtual machine 54.

The thin client IF 544 performs processing for communicating with the thin client 6.

Specifically, the thin client IF 544 receives signals from the thin client 6 over the network 100 and outputs the signals to the application module 542.

Further, the thin client IF 544 receives signals from the application module 542 and outputs the signals over the network 100 to the thin client 6.

Figure 17:
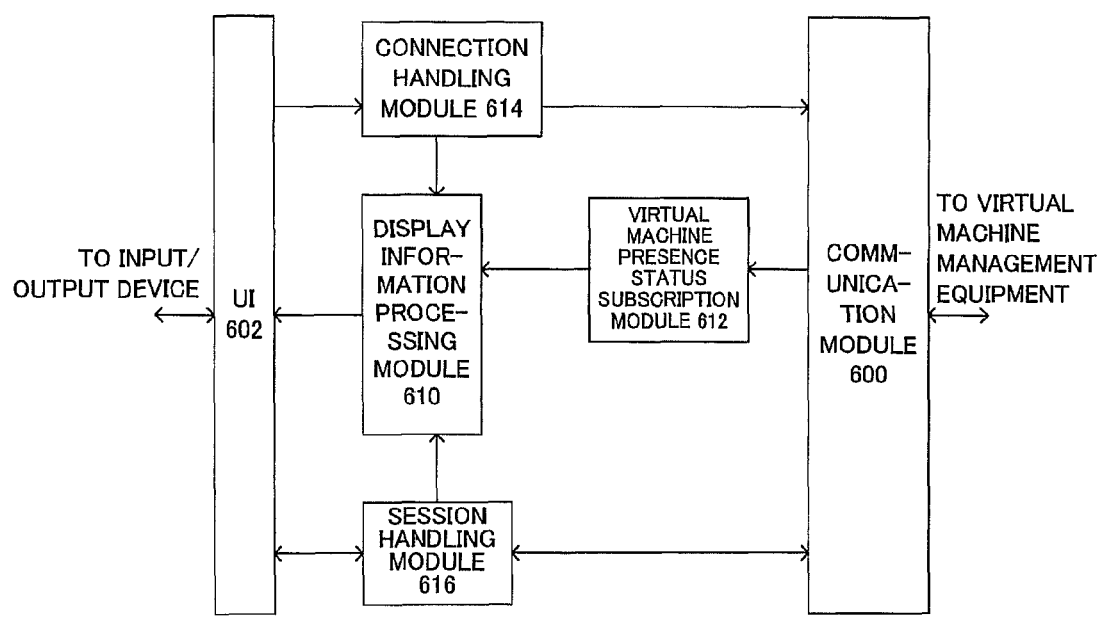
FIG. 17 is a diagram showing a configuration of a thin client program which is run on the thin client shown in FIG. 1, according to an embodiment.

FIG. 17 is a diagram showing the configuration of a thin client program 60, which is run on the thin client 6 shown in FIG. 1.

As illustrated in FIG. 17, the thin client program 60 includes a communication module 600, a UI module 602, a display information processing module 610, a virtual machine presence status subscription module 612, a connection handling module 614, and a session handling module 616.

In the thin client program 60, the communication module 600 performs processing necessary to communicate with the virtual machine management equipment 5 over the network 100.

The UI module 602 receives signals generated as the user operates the input/output device 126, and outputs data indicating what operation has been made to the connection handling module 614 and the session handling module 616.

The UI module 602 controls processing of other components of the thin client program 60 according to the operation of the user.

Further, the UI module 602 displays screen data processed by the display information processing module 610 on the input/output device 126.

The UI module 602 also outputs data received from the session handling module 616 to the input/output device 126.

The connection handling module 614 performs processing for connecting with the virtual machine 54 such as authentication processing in response to data received from the UI module 602 and indicating what operation the user has made.

The connection handling module 614 sends, to the virtual machine management equipment 5, via the communication module 600 and the network 100, data necessary to connect with the virtual machine 54.

Further, the connection handling module 614 also outputs data to be displayed on the input/output device 126 to the display information processing module 610.

The virtual machine presence status subscription module 612 receives the virtual machine presence status from the virtual machine management equipment 5 via the communication module 600 and the network 100, and outputs the received presence status to the display information processing module 610.

The session handling module 616 performs processing for establishing a session with the virtual machine 54 after the connection handling module 614 finishes the processing of connecting with the virtual machine 54, thereby enabling the thin client 6 to use the virtual machine 54.

The session handling module 616 outputs data that needs to be displayed on the screen to the display information processing module 610, and outputs other data that needs to be output to the input/output device 126 to the UI module 602.

The display information processing module 610 performs processing for having the input/output device 126 display data received from the connection handling module 614, the virtual machine presence status subscription module 612, and the session handling module 616, and outputs the processed data to the UI module 602.

An example of controlling a virtual machine according to the user presence status in the controller system 1 will be described next.

Figure 18:
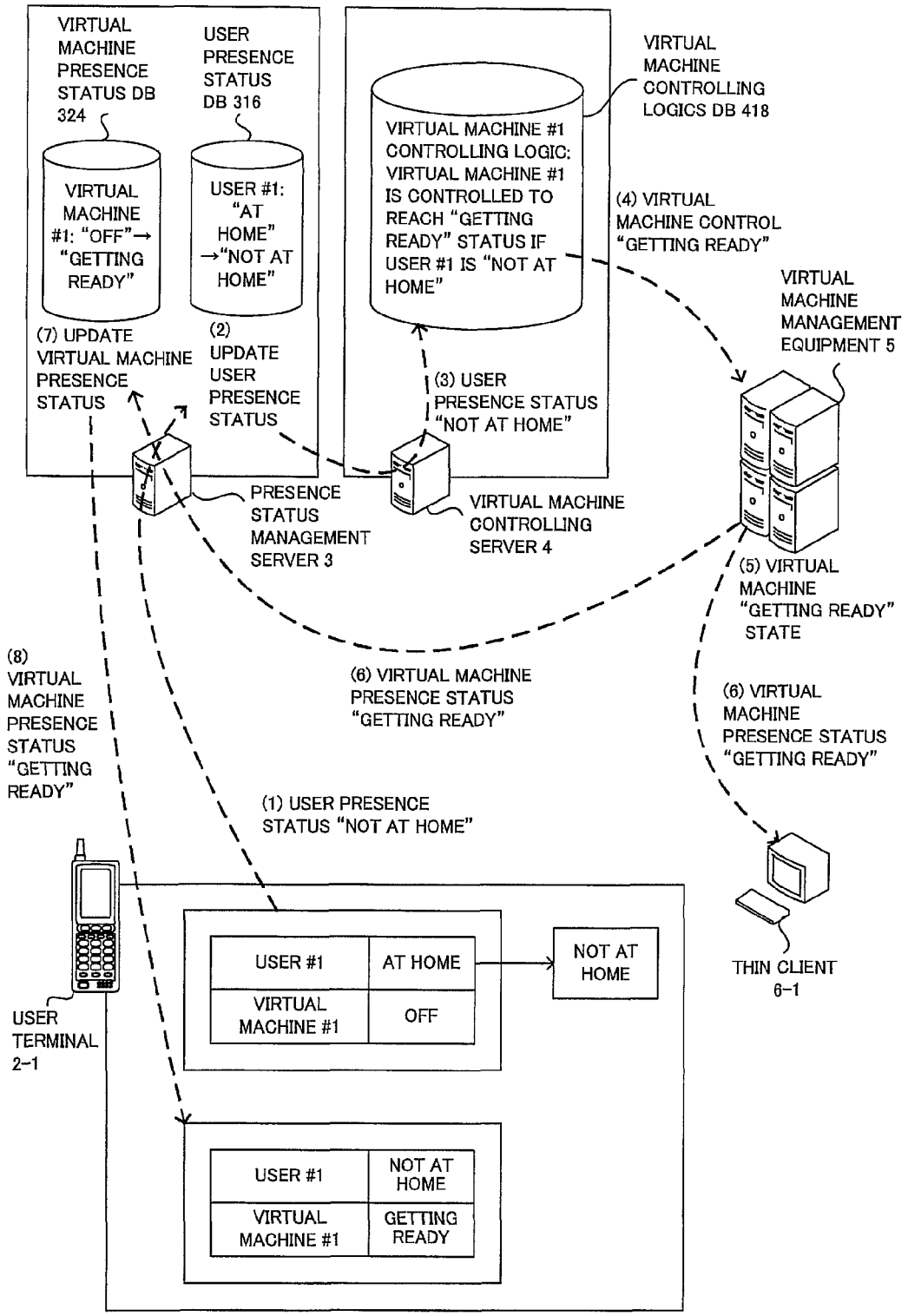
FIG. 18 is a diagram showing an example of how the virtual machine is controlled to change from "OFF" to "getting ready" in the controller system when the user status is updated from "at home" to "not at home", according to an embodiment.

FIG. 18 is a diagram showing an example of how a virtual machine is controlled to change from "OFF" to "getting ready" in the controller system 1 when the user status is updated from "at home" to "not at home."

As shown in FIG. 18, the controller system 1 controls a virtual machine as follows:

(1) When the status of User #1 who is using the user terminal 2-1 changes from "at home" to "not at home," the user terminal 2-1 sends the user presence status indicating that the status of User #1 is "not at home" to the presence status management server 3.

The user terminal 2-1 simultaneously updates the presence status of User #1 that is displayed on the display 232 from "at home" to "not at home."

Alternatively, the displayed presence status of User #1 may be updated after the presence status of User #1 is received from the presence status management server 3 (the same applies to processing described below with reference to FIGS. 19 to 22).

(2) The presence status management server 3 updates the presence status of User #1 that has been stored in the user presence status DB 316 from "at home" to "not at home."

(3) The presence status management server 3 sends the user presence status indicating that the status of User #1 is "not at home" to the virtual machine controlling server 4.

(4) The virtual machine controlling server 4 searches the virtual machine controlling logics DB 418 for the controlling logic of Virtual Machine #1 which is associated with User #1, obtains controlling information that instructs to control Virtual Machine #1 to establish the "getting ready" status when User #1 is "not at home," and sends the controlling information to the virtual machine management equipment 5.

(5) The virtual machine management equipment 5 controls Virtual Machine #1 such that Virtual Machine #1 reaches the "getting ready" status.

(6) The virtual machine management equipment 5 sends the presence status indicating that Virtual Machine #1 has reached the "getting ready" status to the presence status management server 3 and the thin client 6-1.

(7) The presence status management server 3 updates the presence status of Virtual Machine #1 that has been stored in the virtual machine presence status DB 324 from "OFF" to "getting ready."

(8) The presence status management server 3 sends the presence status indicating that Virtual Machine #1 has reached the "getting ready" status to the user terminal 2-1.

Further, when receiving the presence status indicating that Virtual Machine #1 has reached the "getting ready" status, the user terminal 2-1 updates the presence status of Virtual Machine #1 that is displayed on the display 232 from "OFF" to "getting ready."

Figure 19:
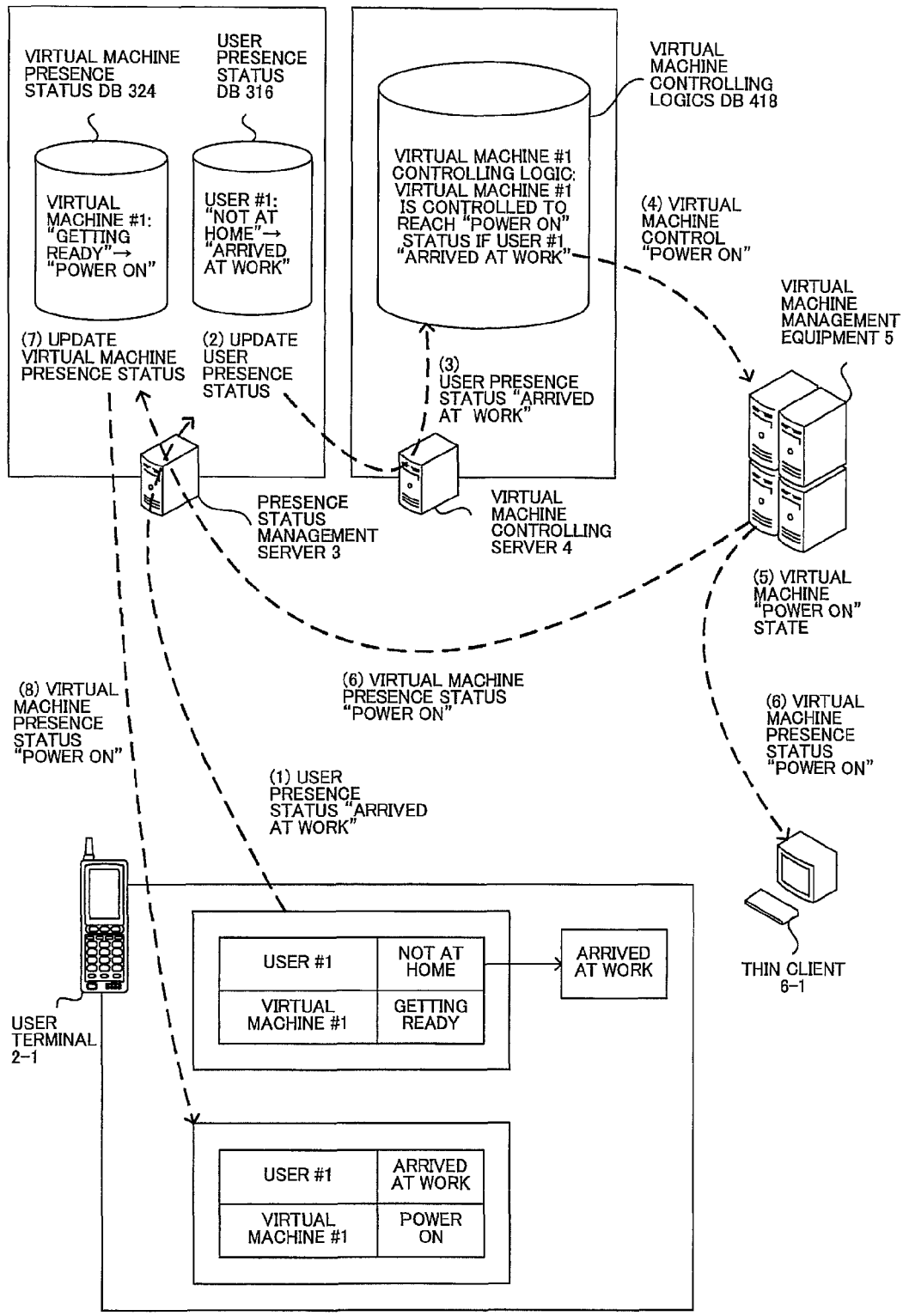
FIG. 19 is a diagram showing an example of how the virtual machine is controlled to change from "getting ready" to "power ON" in the controller system when the user status is updated from "not at home" to "arrived at work", according to an embodiment.

FIG. 19 is a diagram showing an example of how a virtual machine is controlled to change from "getting ready" to "power ON" in the controller system 1 when the user status is updated from "not at home" to "arrived at work."

As shown in FIG. 19, the controller system 1 controls a virtual machine as follows:

(1) When the status of User #1 who is using the user terminal 2-1 changes from "not at home" to "arrived at work," the user terminal 2-1 sends the user presence status indicating that the status of User #1 is "arrived at work" to the presence status management server 3.

The user terminal 2-1 simultaneously updates the presence status of User #1 that is displayed on the display 232 from "not at home" to "arrived at work."

(2) The presence status management server 3 updates the presence status of User #1 that has been stored in the user presence status DB 316 from "not at home" to "arrived at work."

(3) The presence status management server 3 sends the user presence status indicating that the status of User #1 is "arrived at work" to the virtual machine controlling server 4.

(4) The virtual machine controlling server 4 searches the virtual machine controlling logics DB 418 for the controlling logic of Virtual Machine #1 which is associated with User #1, obtains controlling information that instructs to control Virtual Machine #1 to establish the "power ON" status when User #1 is "arrived at work," and sends the controlling information to the virtual machine management equipment 5.

(5) The virtual machine management equipment 5 controls Virtual Machine #1 such that Virtual Machine #1 reaches the "power ON" status.

(6) The virtual machine management equipment 5 sends the presence status indicating that Virtual Machine #1 has reached the "power ON" status to the presence status management server 3 and the thin client 6-1.

(7) The presence status management server 3 updates the presence status of Virtual Machine #1 that has been stored in the virtual machine presence status DB 324 from "getting ready" to "power ON."

(8) The presence status management server 3 sends the presence status indicating that Virtual Machine #1 has reached the "power ON" status to the user terminal 2-1.

Further, when receiving the presence status indicating that Virtual Machine #1 has reached the "power ON" status, the user terminal 2-1 updates the presence status of Virtual Machine #1 that is displayed on the display 232 from "getting ready" to "power ON."

Figure 20:
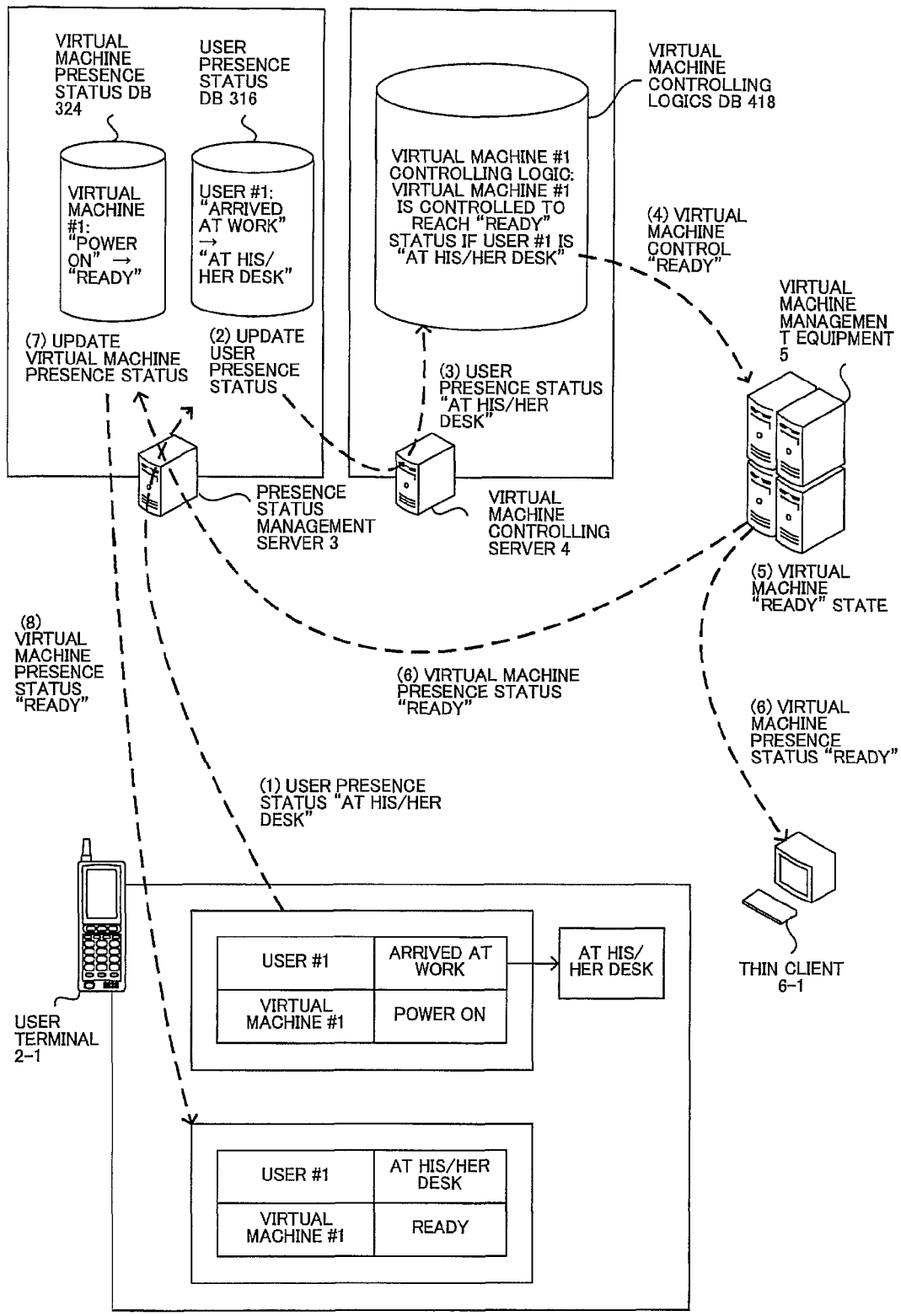
FIG. 20 is a diagram showing an example of how the virtual machine is controlled to change from "power ON" to "ready" status in the controller system when the user status is updated from "arrived at work" to "at his/her desk", according to an embodiment.

FIG. 20 is a diagram showing an example of how a virtual machine is controlled to change from "power ON" to "ready" in the controller system 1 when the user status is updated from "arrived at work" to "at his/her desk."

As shown in FIG. 20, the controller system 1 controls a virtual machine as follows:

(1) When the status of User #1 who is using the user terminal 2-1 changes from "arrived at work" to "at his/her desk," the user terminal 2-1 sends the user presence status indicating that the status of User #1 is "at his/her desk" to the presence status management server 3.

The user terminal 2-1 simultaneously updates the presence status of User #1 that is displayed on the display 232 from "arrived at work" to "at his/her desk."

(2) The presence status management server 3 updates the presence status of User #1 that has been stored in the user presence status DB 316 from "arrived at work" to "at his/her desk."

(3) The presence status management server 3 sends the user presence status indicating that the status of User #1 is "at his/her desk" to the virtual machine controlling server 4.

(4) The virtual machine controlling server 4 searches the virtual machine controlling logics DB 418 for the controlling logic of Virtual Machine #1 which is associated with User #1, obtains controlling information that instructs to control Virtual Machine #1 to establish the "ready" status when User #1 is "at his/her desk," and sends this controlling information to the virtual machine management equipment 5.

(5) The virtual machine management equipment 5 controls Virtual Machine #1 such that Virtual Machine #1 reaches the "ready" status.

(6) The virtual machine management equipment 5 sends the presence status indicating that Virtual Machine #1 has reached the "ready" status to the presence status management server 3 and the thin client 6-1.

(7) The presence status management server 3 updates the presence status of Virtual Machine #1 that has been stored in the virtual machine presence status DB 324 from "power ON" to "ready."

(8) The presence status management server 3 sends the presence status indicating that Virtual Machine #1 has reached the "ready" status to the user terminal 2-1.

Further, when receiving the presence status indicating that Virtual Machine #1 has reached the "ready" status, the user terminal 2-1 updates the presence status of Virtual Machine #1 that is displayed on the display 232 from "power ON" to "ready."

Figure 21:
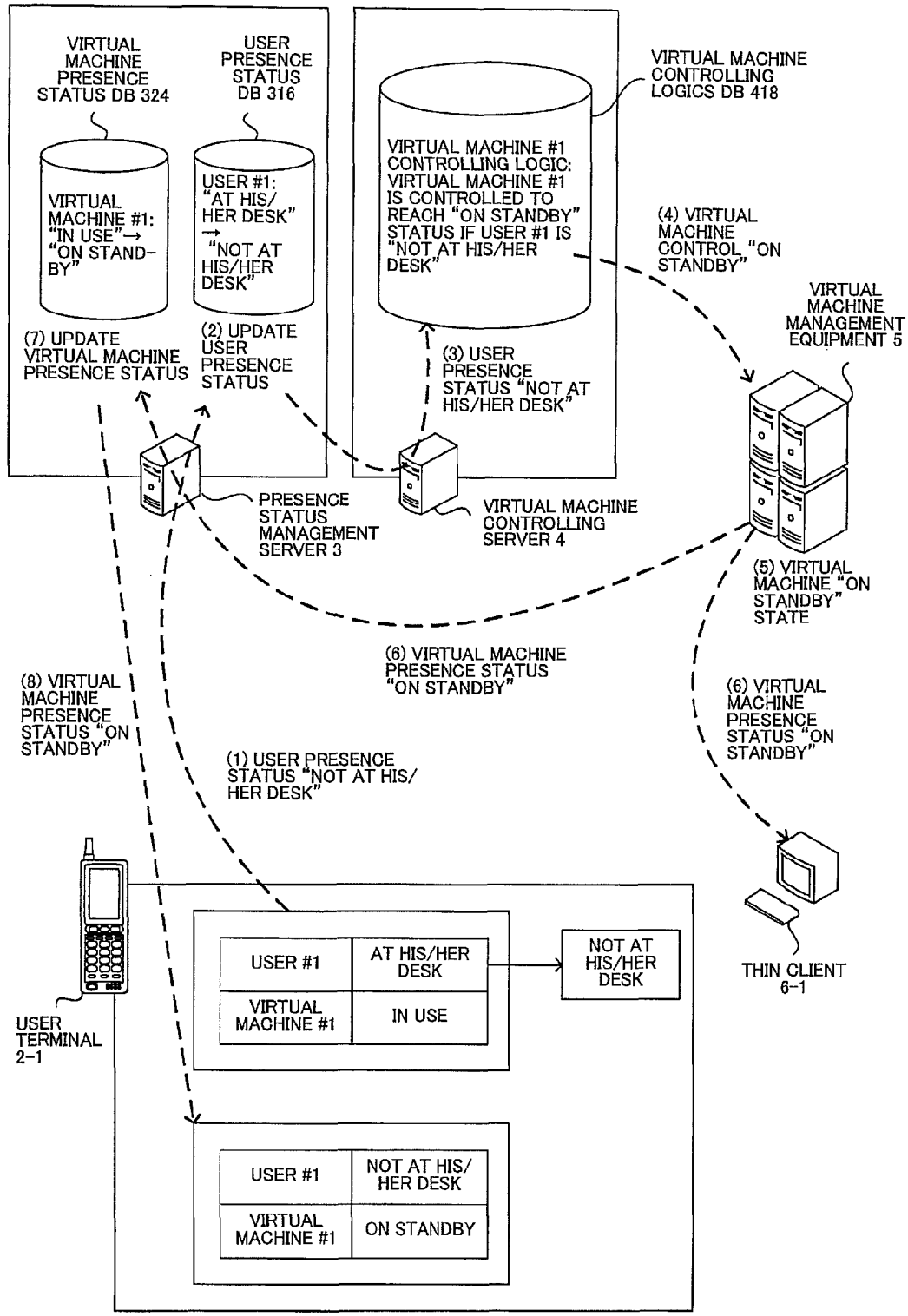
FIG. 21 is a diagram showing an example of how the virtual machine is controlled to change from "in use" to "on standby" status in the controller system when the user status is updated from "at his/her desk" to "not at his/her desk", according to an embodiment.

FIG. 21 is a diagram showing an example of how a virtual machine is controlled to change from "in use" to "on standby" in the controller system 1 when the user status is updated from "at his/her desk" to "not at his/her desk."

As shown in FIG. 21, the controller system 1 controls a virtual machine as follows:

(1) When the status of User #1 who is using the user terminal 2-1 changes from "at his/her desk" to "not at his/her desk," the user terminal 2-1 sends the user presence status indicating that the status of User #1 is "not at his/her desk" to the presence status management server 3.

The user terminal 2-1 simultaneously updates the presence status of User #1 that is displayed on the display 232 from "at his/her desk" to "not at his/her desk."

(2) The presence status management server 3 updates the presence status of User #1 that has been stored in the user presence status DB 316 from "at his/her desk" to "not at his/her desk."

(3) The presence status management server 3 sends the user presence status indicating that the status of User #1 is "not at his/her desk" to the virtual machine controlling server 4.

(4) The virtual machine controlling server 4 searches the virtual machine controlling logics DB 418 for the controlling logic of Virtual Machine #1 which is associated with User #1, obtains controlling information that instructs to control Virtual Machine #1 to establish the "on standby" status when User #1 is "not at his/her desk," and sends this controlling information to the virtual machine management equipment 5.

(5) The virtual machine management equipment 5 controls Virtual Machine #1 such that Virtual Machine #1 reaches the "on standby" status.

(6) The virtual machine management equipment 5 sends the presence status indicating that Virtual Machine #1 has reached the "ready" status to the presence status management server 3 and the thin client 6-1.

(7) The presence status management server 3 updates the presence status of Virtual Machine #1 that has been stored in the virtual machine presence status DB 324 from "in use" to "ready."

(8) The presence status management server 3 sends the presence status indicating that Virtual Machine #1 has reached the "ready" status to the user terminal 2-1.

Further, when receiving the presence status indicating that Virtual Machine #1 has reached the "ready" status, the user terminal 2-1 updates the presence status of Virtual Machine #1 that is displayed on the display 232 from "in use" to "ready."

Figure 22:
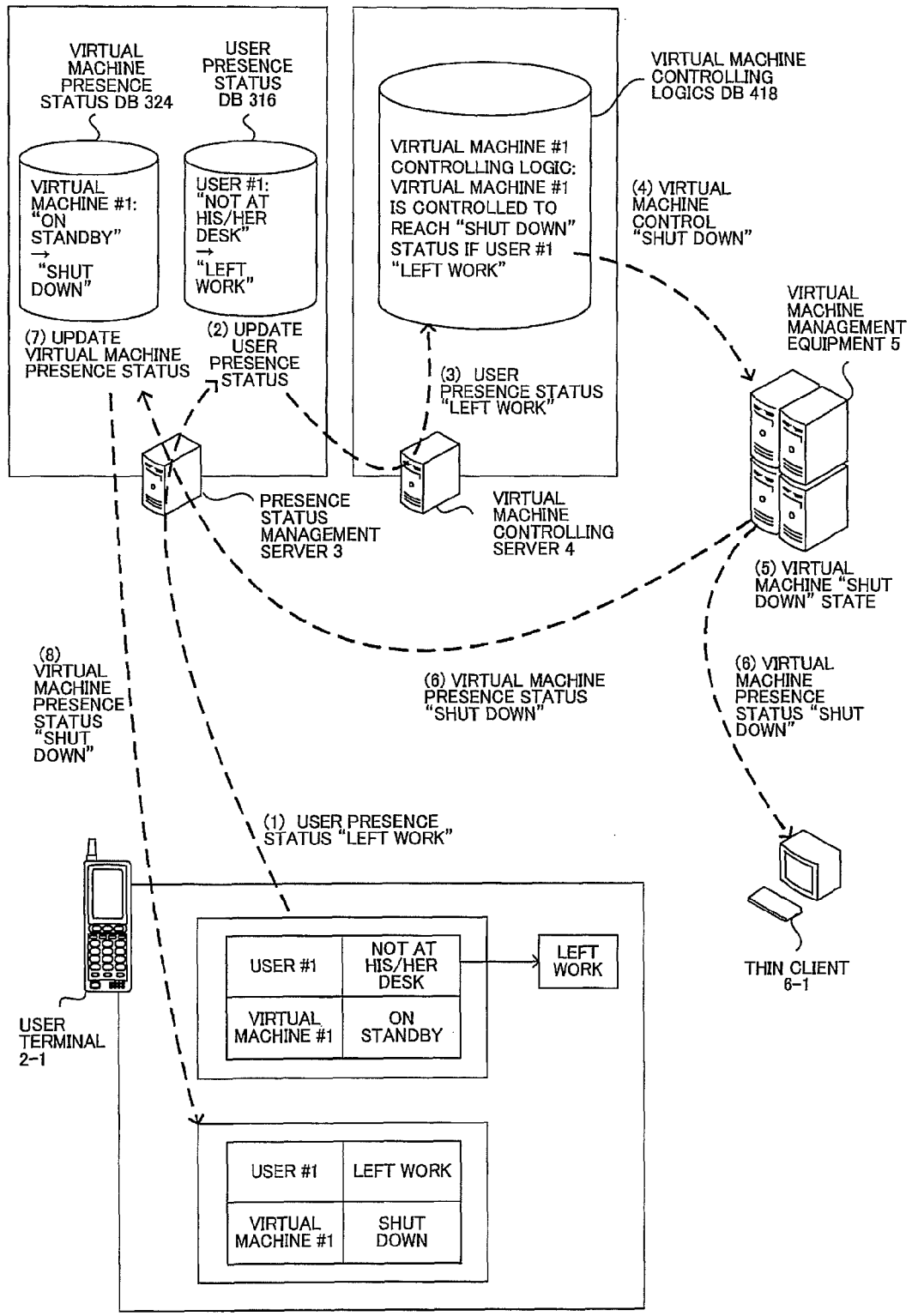
FIG. 22 is a diagram showing an example of how the virtual machine is controlled to change from "on standby" to "shut down" status in the controller system when the user status is updated from "not at his/her desk" to "left work", according to an embodiment.

FIG. 22 is a diagram showing an example of how a virtual machine is controlled to change from "on standby" to "shut down" in the controller system 1 when the user status is updated from "not at his/her desk" to "left work."

As shown in FIG. 22, the controller system 1 controls a virtual machine as follows:

(1) When the status of User #1 who is using the user terminal 2-1 changes from "not at his/her desk" to "left work," the user terminal 2-1 sends the user presence status indicating that the status of User #1 is "left work" to the presence status management server 3.

Further, the user terminal 2-1 simultaneously updates the presence status of User #1 that is displayed on the display 232 from "not at his/her desk" to "left work."

(2) The presence status management server 3 updates the presence status of User #1 that has been stored in the user presence status DB 316 from "not at his/her desk" to "left work."

(3) The presence status management server 3 sends the user presence status indicating that the status of User #1 is "left work" to the virtual machine controlling server 4.

(4) The virtual machine controlling server 4 searches the virtual machine controlling logics DB 418 for the controlling logic of Virtual Machine #1 which is associated with User #1, obtains controlling information that instructs to control Virtual Machine #1 to establish the "shut down" status when User #1 is "left work," and sends this controlling information to the virtual machine management equipment 5.

(5) The virtual machine management equipment 5 controls Virtual Machine #1 such that Virtual Machine #1 reaches the "shut down" status.

(6) The virtual machine management equipment 5 sends the presence status indicating that Virtual Machine #1 has reached the "shut down" status to the presence status management server 3 and the thin client 6-1.

(7) The presence status management server 3 updates the presence status of Virtual Machine #1 that has been stored in the virtual machine presence status DB 324 from "on standby" to "shut down."

(8) The presence status management server 3 sends the presence status indicating that Virtual Machine #1 has reached the "shut down" status to the user terminal 2-1.

Further, when receiving the presence status indicating that Virtual Machine #1 has reached the "shut down" status, the user terminal 2-1 updates the presence status of Virtual Machine #1 that is displayed on the display 232 from "on standby" to "shut down."

Next, an overall operation of the controller system 1 will be described.

Figure 23:
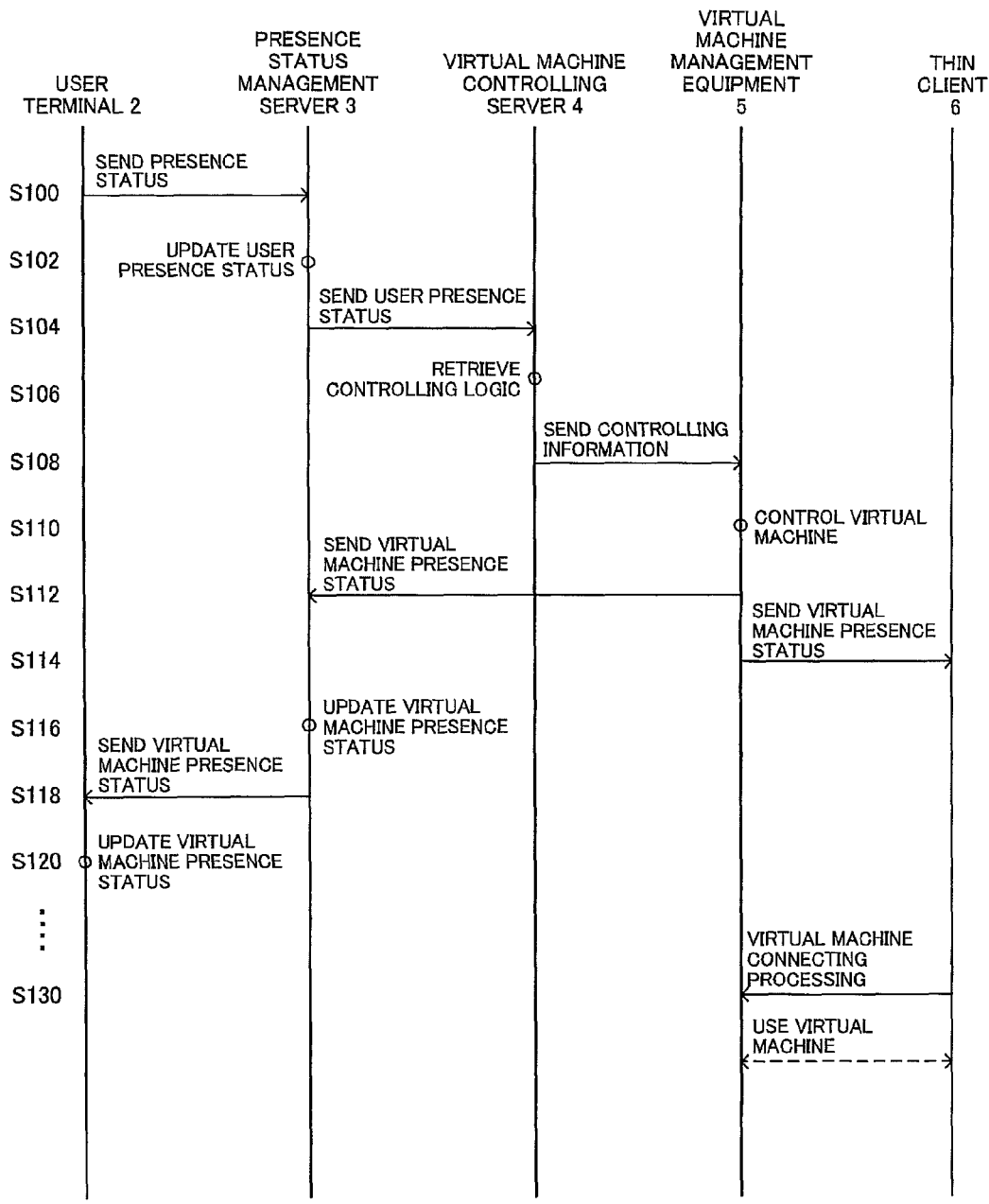
FIG. 23 is a communication sequence diagram showing an overall operation of the controller system shown in FIG. 1, according to an embodiment.

FIG. 23 is a communication sequence diagram illustrating the overall operation (S10) of the controller system 1 shown in FIG. 1.

As illustrated in FIG. 23, in Step 100 (S100), the user terminal 2 sends the presence status of a user who is using this user terminal 2 to the presence status management server 3.

In Step S102 (S102), the presence status management server 3 updates the stored user presence status.

In Step S104 (S104), the presence status management server 3 sends the user presence status to the virtual machine controlling server 4.

In Step S106 (S106), the virtual machine controlling server 4 searches for the control logic of a virtual machine that is associated with the user for which the user presence status has been created.

In Step S108 (S108), the virtual machine controlling server 4 sends the virtual machine presence status to the virtual machine management equipment 5.

In Step S110 (S110), the virtual machine management equipment 5 controls the virtual machine according to the virtual machine presence status.

In Step S112 (S112), the virtual machine management equipment 5 sends the virtual machine presence status to the presence status management server 3.

In Step S114 (S114), the virtual machine management equipment 5 sends the virtual machine presence status to the thin client 6.

In Step S116 (S116), the presence status management server 3 updates the stored virtual machine presence status.

In Step S118 (S118), the presence status management server 3 sends the virtual machine presence status to the user terminal 2.

In Step S120 (S120), the user terminal 2 updates the displayed virtual machine presence status.

Hereinafter, S100 to S120 are repeated for each new state that the user and virtual machine presence reaches.

In Step S130 (S130), the thin client 6 performs virtual machine connecting processing to the virtual machine management equipment 5, and the processing enables the thin client 6 to use the virtual machine.

It should be noted that the execution order and the like of the steps shown in FIG. 23 may be appropriately changed.

Figure 24:
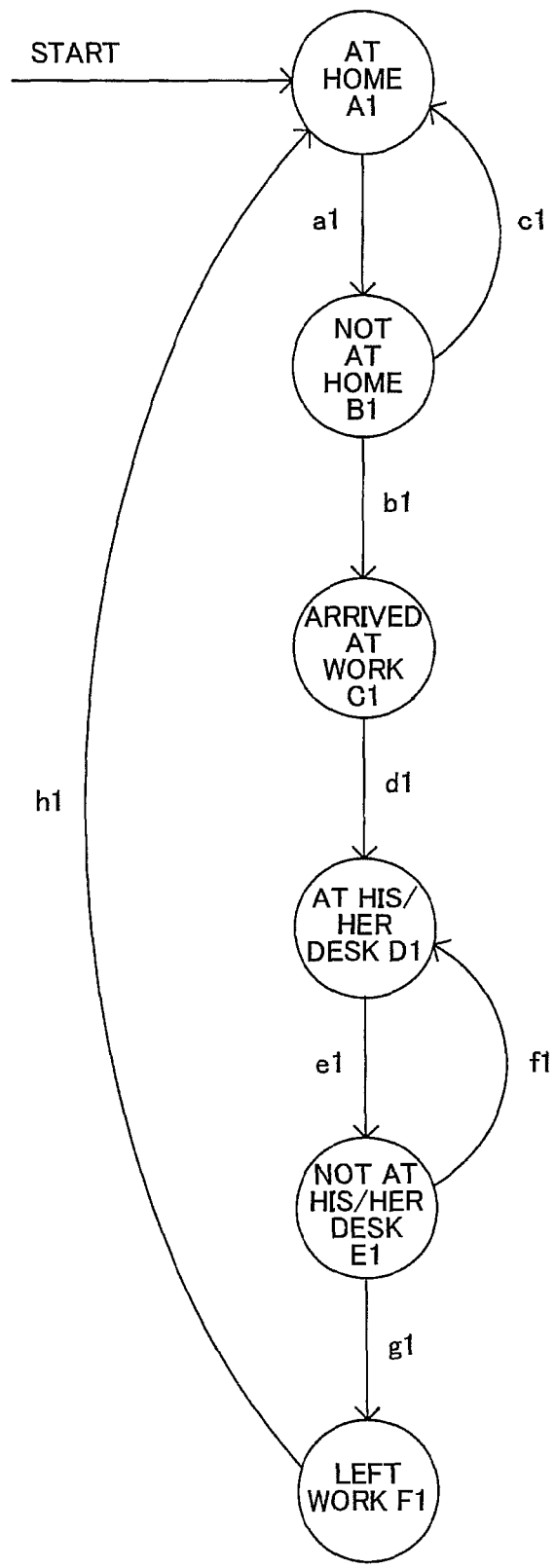
FIG. 24 is a status transition diagram showing an example of transitions of the user presence status, according to an embodiment.

FIG. 24 is a status transition diagram showing an example of the transitions of the user presence status.

As shown in FIG. 24, the user presence status in the controller system 1 takes any one of "at home" status A1, "not at home" status B1, arrived at work status C1, at his/her desk status D1, not at his/her desk status E1, and left work status F1, for example.

The at home status A1 means that the user is at home.

The not at home status B1 means that the user is away from home.

The arrived at work status C1 means that the user has entered his/her office.

The at his/her desk status D1 means that the user is seated at his/her desk in the office.

The not at his/her desk status E1 means that the user is not at his/her desk and is somewhere in the office.

The left work status F1 means that the user left the office.

When the processing is started, the user presence status is set to the at home status A1 if the user is at home.

When the user leaves home and the user terminal 2 sends the user presence status indicating "not at home," the user presence status shifts to the not at home status B1 (a1).

When the user enters his/her office and the user terminal 2 sends the user presence status indicating "arrived at work," the user presence status shifts to the arrived at work status C1 (b1).

When the user returns home without going to work and the user terminal 2 sends the user presence status indicating "at home," the user presence status returns to the at home status A1 (c1).

When the user sits at his/her desk in the office and the user terminal 2 sends the user presence status indicating "at his/her desk," the user presence status shifts to the at his/her desk status D1 (d1).

When the user leaves his/her desk and the user terminal 2 sends the user presence status indicating "not at his/her desk," the user presence status shifts to the not at his/her desk status E1 (e1).

When the user returns to his/her desk and the user terminal 2 sends the user presence status indicating "at his/her desk," the user presence status returns to the at his/her desk status D1 (f1).

When the user leaves the office and the user terminal 2 sends the user presence status indicating "left work," the user presence status shifts to the left for the day status F1 (g1).

When the user returns home and the user terminal 2 sends the user presence status indicating "at home," the user presence status shifts to the at home status A1 (h1).

Figure 25:
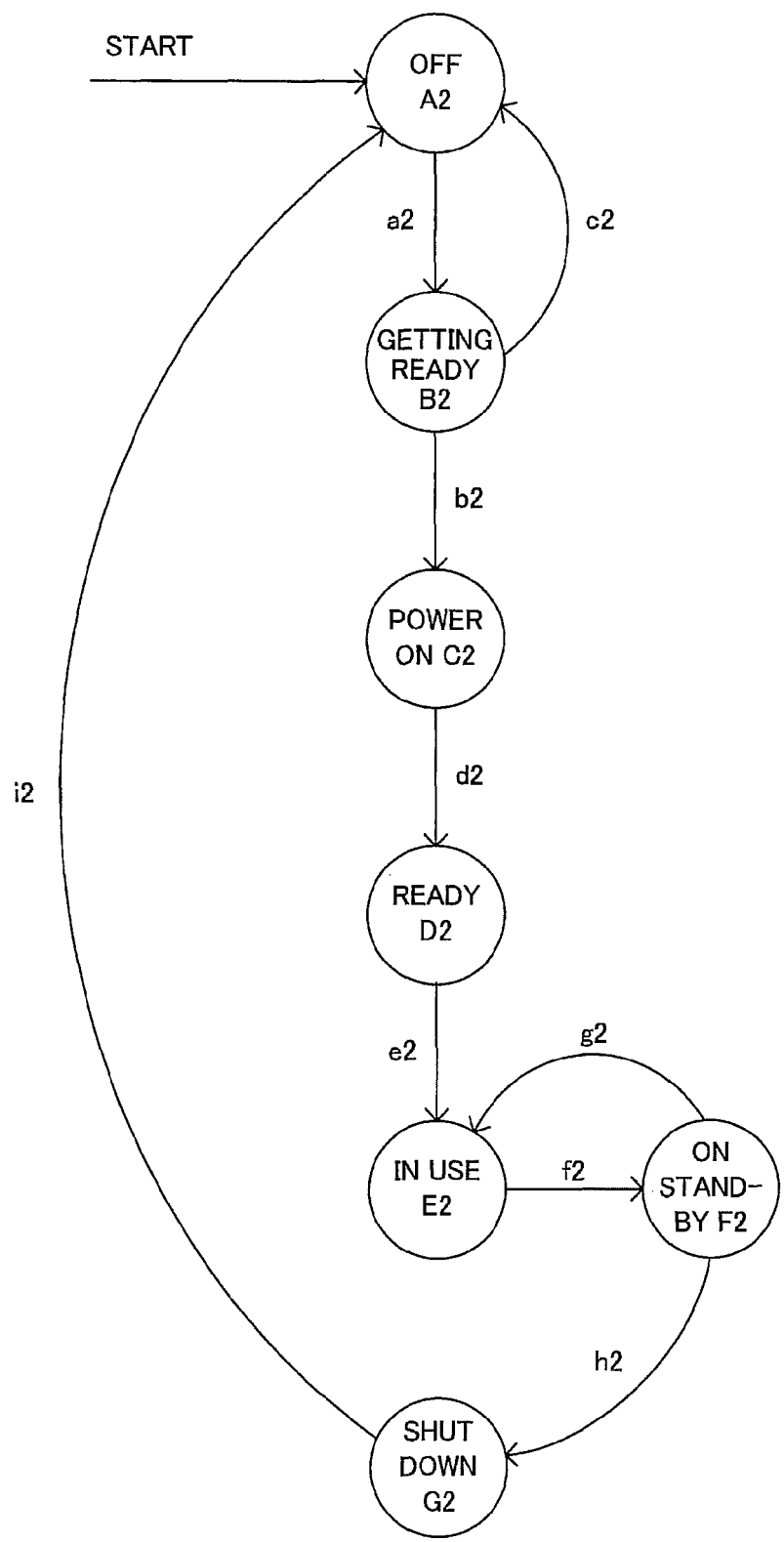
FIG. 25 is a status transition diagram showing an example of transitions of the virtual machine presence status, according to an embodiment.

FIG. 25 is a status transition diagram showing an example of the transitions of the virtual machine presence status.

As shown in FIG. 25, the virtual machine presence status in the controller system 1 takes any one of OFF status A2, getting ready status B2, power ON status C2, ready status D2, in use status E2, on standby status F2, and shut down status G2, for example.

The OFF status A2 means that the image of the virtual machine is evacuated from the memory 124 to the disk device 130 as previously described.

The getting ready status B2 is a status where the image of the virtual machine which is stored in the disk device 130 of the virtual machine management equipment 5 is read onto the memory 124 as previously described.

The power ON status C2 is a status where the processing of activating the virtual machine is started as previously described.

The ready status D2 is a status where the virtual machine has finished all of the activation processing and is waiting to be accessed by the thin client 6 as previously described.

The in use status E2 is a status where the virtual machine is being used by the thin client 6 as previously described.

The on standby status F2 is a status where the virtual machine enters a sleep mode as previously described.

The shut down status G2 is a status where the processing of shutting down the virtual machine is executed as previously described.

When the processing is started, the virtual machine presence status is set to the OFF status A2.

When the user presence status shifts to the not at home status B1 and the virtual machine controlling server 5 controls the virtual machine of the virtual machine management equipment 5 to establish the "getting ready" status, the virtual machine presence status shifts to the getting ready status B2 (a2).

When the user presence status shifts to the arrived at work status C1 and the virtual machine controlling server 4 controls the virtual machine of the virtual machine management equipment 5 to establish the "power ON" status, the virtual machine presence status shifts to the power ON status C2 (b2).

When the user presence status returns to the at home status A1 and the virtual machine controlling server 4 controls the virtual machine of the virtual machine management equipment 5 to re-establish to the "OFF" status, the virtual machine presence status shifts to the OFF status A2 (c2).

When the user presence status shifts to the at his/her desk status D1 and the virtual machine controlling server 4 controls the virtual machine of the virtual machine management equipment 5 to establish the "ready" status, the virtual machine presence status shifts to the ready status D2 (d2).

When the thin client 6 performs the connection processing to the virtual machine management equipment 5 and a session is started between the thin client 6 and the virtual machine management equipment 5, the virtual machine presence status shifts to the in use status E2 (e2).

When the user presence status shifts to the not at his/her desk status E1 and the virtual machine controlling server 4 controls the virtual machine of the virtual machine management equipment 5 to establish the "on standby" status, the virtual machine presence status shifts to the on standby status F2 (f2).

When the user presence status returns to the at his/her desk status D1 and the virtual machine controlling server 4 controls the virtual machine of the virtual machine management equipment 5 to re-establish the "in use" status, the virtual machine presence status returns to the in use status E2 (g2).

When the user presence status shifts to the left work status F1 and the virtual machine controlling server 4 controls the virtual machine of the virtual machine management equipment 5 to establish the "shut down" status, the virtual machine presence status shifts to the shut down status G2 (h2).

When the shutdown processing is completed, the virtual machine presence status shifts to the OFF status A2 (i2).

It should be noted that the user presence status is created by an input operation of a user in this embodiment. Instead of an input operation of a user, the user presence status may be created automatically from, for example, global positioning system (GPS) signals received by the user terminal 2.

Also, as mentioned above, the user presence status does not need to be created by the user terminal 2 and may be created by other components.

Further, in this embodiment, the virtual machine OS 540 is run on the system OS 536 in the virtual machine management program 50. However, the virtual machine OS 540 can be omitted as long as the system OS 536 has the function of running the virtual machine 54.

Further, the thin client program 60 shown in FIG. 17 is run on the thin client 6 shown in FIG. 1 in this embodiment. Alternatively, the same function may be executed in the user terminal 2 shown in FIG. 1.

Further, in this embodiment, the user presence status and the virtual machine presence status are discriminated from each other and treated as separate information in the presence status management program 30 as shown in FIG. 11, but may be treated as one same piece of information in the presence status management program 30.

A possible mode in this case is to modify the above embodiment such that the identifier of a user (user identifier) in the user presence status shown in FIG. 8 and the identifier of a virtual machine (virtual machine identifier) in the virtual machine presence status shown in FIG. 9 are allocated from the same identifier space. The mode also includes integrating the user presence status subscription module 310 and the virtual machine presence status subscription module 320, integrating the user presence status publishing module 318 and virtual machine presence status publishing module 326, integrating the user presence status management module 314 and virtual machine presence status management module 322, and integrating the user presence status DB 316 and virtual machine presence status DB 324, which are shown in FIG. 11.

One or more of the steps of the method 400 and other steps described herein may be implemented as software embedded on a computer readable medium, such as memory, and executed for example, by a processor. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the scope of the claimed embodiments.

What is claimed is:

1. A controller system which controls a controlled target, comprising a non-transitory computer readable medium for controlling the controlled target by having a computer execute the following steps including:
   detecting, by a user status detection mechanism, status of a user of the controlled target;
   detecting, by a controlled target status detection mechanism, status of the controlled target; and
   controlling, by a control mechanism that is executed by a hardware processor, the controlled target by mapping the detected status of the user and the detected status of the controlled target.

2. A controller system according to claim 1,
   wherein the status of the controlled target includes multi-state statuses, and
   the non-transitory computer readable medium for controlling the controlled target by having the computer execute the following further step including:
   controlling the controlled target for each of the multiple states.

3. A controller system according to claim 2,
   wherein the status of the user includes multi-state statuses, and
   the non-transitory computer readable medium for controlling the controlled target by having the computer execute the following further step including:
   controlling the controlled target by mapping the multiple states of the user and the multiple states of the controlled target.

4. A controller system according to claim 1, wherein the controlled target is a virtual machine.

5. A controller system according to claim 4, the non-transitory computer readable medium for controlling the controlled target by having the computer execute the following further steps including:
   running, by multiple processing equipment, the virtual machine; and
   performing, by an allocation mechanism, processing for allocating the processing equipment to the virtual machine.

6. A controller system according to claim 5, the non-transitory computer readable medium for controlling the controlled target by having the computer execute the following further step including:
   allocating, by the allocation mechanism, the processing equipment according to usage rates of the respective processing equipment.

7. A controller system according to claim 6, the non-transitory computer readable medium for controlling the controlled target by having the computer execute the following further steps including:

requesting, by a processing equipment condition request mechanism, a condition of the processing equipment that is allocated to the virtual machine; and allocating, by the allocation mechanism, the processing equipment to the virtual machine according to the condition requested by the processing equipment condition request mechanism.

8. A controller system according to claim 7, the non-transitory computer readable medium for controlling the controlled target by having the computer execute the following further steps including:

using, by a virtual machine terminal, the virtual machine; and controlling the virtual machine terminal according to the status of the virtual machine.

9. A controller system according to claim 1, the non-transitory computer readable medium for controlling the controlled target by having the computer execute the following further step including:

displaying, by a status display mechanism, a status of the controlled target.

10. A controller system according to claim 9, the non-transitory computer readable medium for controlling the controlled target by having the computer execute the following further step including:

transmitting, by a user terminal, the status of the user, wherein the user terminal contains the status display mechanism.

11. A method of controlling a controlled target, comprising:

detecting status of a user of the controlled target;
detecting status of the controlled target; and
controlling, by a hardware processor, the controlled target by mapping the detected status of the user and the detected status of the controlled target.

12. A controlling program stored on a non-transitory computer readable medium and for controlling a controlled target by having a computer execute the following steps including:

detecting status of a user of the controlled target;
detecting status of the controlled target; and
controlling, by a hardware processor, the controlled target by mapping the detected status of the user and the detected status of the controlled target.

13. A controller system according to claim 1, the non-transitory computer readable medium for controlling the controlled target by having the computer execute the following further step including:

selectively changing, by the control mechanism, the status of the controlled target upon change in the detected status of the user.

14. A controller system according to claim 1, the non-transitory computer readable medium for controlling the controlled target by having the computer execute the following further step including:

automatically changing, by the control mechanism, the status of the controlled target upon change in the detected status of the user.

15. A method according to claim 11, wherein controlling the controlled target further comprises selectively changing the status of the controlled target upon change in the detected status of the user.

16. A method according to claim 11, wherein controlling the controlled target further comprises automatically changing the status of the controlled target upon change in the detected status of the user.

17. A method according to claim 11,
wherein the status of the controlled target includes multi-state statuses, and
wherein controlling the controlled target further comprises controlling the controlled target for each of the multiple states.

18. A method according to claim 17,
wherein the status of the user includes multi-state statuses, and
wherein controlling the controlled target further comprises controlling the controlled target by mapping the multiple states of the user and the multiple states of the controlled target.

19. A controlling program according to claim 12, wherein controlling the controlled target further comprises selectively changing the status of the controlled target upon change in the detected status of the user.

20. A controlling program according to claim 12, wherein controlling the controlled target further comprises automatically changing the status of the controlled target upon change in the detected status of the user.

* * * * *